US005548784A

United States Patent [19]

Easley, Jr. et al.

[11] Patent Number: 5,548,784

[45] Date of Patent: Aug. 20, 1996

[54] AUTOMATIC DISK CHANGE DETECTION WITHOUT CAUSING HEAD MOVEMENT BY STEP PULSES

[75] Inventors: Ellis Easley, Jr., Ft. Worth; Patricia Gray, Hurst; Johannes Suwandhaputra, Ft. Worth; Julie Wolf, Crowley, all of Tex.

[73] Assignee: Tandy Corporation, Ft. Worth, Tex.

[21] Appl. No.: 263,173

[22] Filed: Jun. 21, 1994

Related U.S. Application Data

[63] Continuation of Ser. No. 722,759, Jun. 27, 1991, abandoned.

[51] Int. Cl.[6] .......... G06F 11/30

[52] U.S. Cl. .......... 395/838; 369/53; 395/835; 395/836; 395/837; 395/839

[58] Field of Search .......... 395/425, 835, 395/836, 837, 838, 839; 369/53

[56] References Cited

U.S. PATENT DOCUMENTS

| | | | |
|---|---|---|---|
| 4,086,659 | 4/1978 | Cizmic et al. | 395/275 |
| 4,357,657 | 11/1982 | Fellinger | 395/425 |
| 4,870,613 | 9/1989 | Clinkenbeard et al. | 395/275 |
| 5,239,426 | 8/1993 | Sakaegi | 360/69 |

*Primary Examiner*—Ken S. Kim

*Attorney, Agent, or Firm*—Townsend and Townsend and Crew

[57] ABSTRACT

A method and apparatus for detecting diskette change is provided. A step pulse signal generated using the CPU is sent to the step pulse line of the disk drive, in addition to the normal step pulse signal which can be issued from the floppy disk controller. Thus, a step pulse can be issued directly by the CPU without using the FDC. By positioning the head in the outmost cylinder and issuing a step pulse, at a time when the direction signal indicates outward direction, the door-open status signal can be updated, without causing movement of the head. By preventing head movement in response to a step pulse, door-open status information is updated without undesirable effects of excessive head movement, drive spinning, head movement noise, constant illumination of the drive light or unnecessarily occupying the CPU or other components.

10 Claims, 14 Drawing Sheets

| FIG. 1A. | FIG. 1B. |
|---|---|

AUTOMATIC DISK CHANGE DETECTION WITHOUT CAUSING HEAD MOVEMENT BY STEP PULSES

This is a Continuation of application Ser. No. 07/722,759, filed Jun. 27, 1991, now abandoned.

FIELD OF THE INVENTION

The present invention relates to a method and apparatus for detecting whether a removable data recording medium, such as a floppy disk, has been removed and replaced with another medium and in particular to a method and apparatus for updating and polling a status line of a disk drive while avoiding excessive head movement.

BACKGROUND OF THE INVENTION

A number of electronic devices, including personal computers, include drives for floppy disks or other removable data recording media. In a number of situations it would be useful if the computer or other apparatus could determine whether the medium has been replaced, e.g., whether a floppy disk or "diskette" has been removed from the disk drive and another (or the same) floppy disk has been inserted into the disk drive. As one example, when loading into the apparatus large programs or large blocks of data recorded on multiple diskettes, it would be useful if the apparatus, after prompting a user to insert the next diskette, could sense the (probable) insertion of the new diskette without requiring the user to separately indicate insertion of the new diskette, such as through a user input device like the keyboard or a mouse. It has not been feasible to provide this function in previous devices.

Some disk drives currently in use provide a door-open or "changeline" status signal which, under certain circumstances, provides an indication of the status of the drive door, i.e., whether the drive door is open or closed. The signal is often termed the "disk change" signal. However, this term is something of a misnomer since, in the present configuration of drives and computers, it is impractical or inconvenient to use the so-called disk change signal to provide information regarding whether a new disk has been inserted. The impracticality arises from the original purpose of the door-open status signal. The purpose of the door-open status signal was to permit the operating system to control the disk drive more efficiently. As long as a given disk remains in the disk drive, the operating system can use, in all further disk access operations, the directory and file allocation information which it initially read from the diskette and stored. This avoids the necessity for moving the head to the outermost cylinder to read the directory and allocation information before each access of a requested disk location. Head motion is time consuming and excessive head movement contributes to inefficiency of floppy disk operations, and results in wear of the drive mechanism. As long as the door has not been opened, it can be assumed that the same diskette resides in the drive and unnecessary head motion can be avoided by using the stored directory and file allocation information.

Since the purpose of providing door-open status information was to ascertain whether or not the door has been opened, little attention was given to providing an efficient and practical way of determining whether, following a door opening, the door has later been closed. In one common type of configuration, a floppy disk controller controls one to three disk drives via a set of multiplexed input signals, a set of multiplexed output signals, and a group of radial "drive select" signals. Each drive responds to certain input signals or drives output signals only when the drive is selected. Among the multiplexed input signals are the "step pulse" signal and the "direction" signal. The "step pulse" signal, in general, causes the head to move radially to an adjacent track or "cylinder". The direction of movement (i.e., radially inward or radially outward) is determined by the "direction" signal.

One of the output signals is the door-open status or so-called "disk change" signal. When a disk drive is selected, the disk drive places an indication of the door status on the door-open status line. In the usual case, the door-open status line is "true" if the door is open (typically indicating no disk is present in the drive). If the door is open and the disk drive receives a step pulse while it is selected, the door-open status remains "true". If, following a door opening, a disk is inserted in the drive and the door is closed, the status will remain "true" until the drive receives a step pulse (while it is selected). If, following a door opening, a disk is inserted, the drive door is closed and a step pulse is issued to the drive, the door-open status signal will be updated, i.e., the door-open status signal will be driven "false" indicating that the door is closed and, typically, a disk is present in the drive.

In a typical personal computer system, the described configuration is used to routinely obtain door-open status information during disk operations for the purpose of providing efficient drive control. This function is handled by the basic input/output system (BIOS), stored in read only memory (ROM). BIOS can determine whether a particular disk drive is a model which provides door-open status information. Each time the operating system requests the BIOS to access a drive which provides door-open status information, the BIOS first polls the door-open status line. If it is "false" (indicating the door has not been opened) the BIOS performs the requested operation (e.g., read a sector, write a sector, or return door-open status). If the disk change status is "true" (indicating the door has been opened), the BIOS returns a status code to the operating system indicating that the door-open status is true. If a read or write operation was requested, that operation is aborted. After returning an indication that the door-open status is "true" BIOS issues a step pulse to the drive to update the door-open status line, in case a new disk has been inserted and the door has been closed. If a new disk has been inserted and the door closed, the door-open status will become "false" after issuance of the step pulse as described above. Thereafter, when the operating system requests BIOS to access the drive, the door-open status will be indicated as "false" (indicating the door is closed) and a requested operation would take place.

Using the described configuration, it is possible to detect when, following a door opening, the door has subsequently been closed. This would involve repeatedly issuing step pulses followed by polls of the door-open status line.

SUMMARY OF THE INVENTION

The present invention permits the computer or other apparatus to determine whether there has been a disk change, (i.e., whether the drive door has been opened, and subsequently, closed) and permits such detection to take place without certain undesirable effects that would have occurred if the present invention were not used. The present invention also includes the recognition of certain problems which occurred in previous devices.

FIGS. 1A and 1B depict the steps to detect a diskette change in previous devices and methods. As shown in FIG. 1A, the floppy disk controller (FDC) receives a request which requires determining whether there has been a disk change. This will typically be a request to access the disk 10 for reading or writing, but could also be a command to determine disk change status. The FDC first selects the disk drive 12 from among the disk drives that the FDC may be controlling. When a disk drive is first selected by the FDC, the disk drive motor will spin. In most configurations, the drive motor is kept spinning for a minimum of two seconds 14. This is to keep the drive motor spinning in case another call is made for access to the same drive within a short time. This procedure is followed because it takes about a second to bring the drive up to speed from a dead stop. However, floppy drives cannot practically spin constantly because the media is touching the head and both the media and the head would wear out in a short time. While the drive is spinning, the front panel light for the drive is turned on 16.

After the drive is selected, the BIOS polls the door-open status 18 to determine whether the "door open" signal is true or false 20. If the door open status is false, this indicates that the door has not been opened and it is possible to perform the requested operation using the directory and file allocation information which is stored in memory 22. If the door open status is true, any read or write request which was issued will be aborted 24 and a code will be returned to the operating system indicating that the "door open" status is "true" 26. Next, the BIOS will send a step pulse to the drive 28 as shown in FIG. 1B. As noted above, this is done in order to update the door-open status signal, in case a new disk has been inserted. As noted above, even if a new disk has been inserted and the door has been closed, the "door open" status will not change until after a step pulse has been issued to the drive.

Issuance of a step pulse to the drive from the FDC is a time-consuming process. A step pulse is issued by executing a seek operation. However, a seek operation will not result in issuance of a step pulse if the head is already at the cylinder which is the subject of the seek command. There is thus a difficulty if BIOS contains outdated information regarding location of the head. In particular, if BIOS issues a command to seek a cylinder different from the cylinder where the head resides, at least one step pulse will result. However, if information available to BIOS indicates that the "target" cylinder included in the seek command is different from the current head location, but, information available to the FDC indicates the head is already at the "target" location, no step pulse will result. This is because the FDC will detect the equality of the target and the head location and will not issue a step pulse in this situation. Therefore, in order to guarantee that a step pulse will always issue, two seek commands must be issued by BIOS: a seek command for the cylinder which, according to BIOS, is the current head location 30, followed by a seek command for a cylinder which, according to BIOS, is different from the current cylinder 32.

Each seek command 30, 32 requires the execution of a large number of commands **30*a*–30*m*, 32*a*–32*m*. The FDC includes a register 77 which includes an indication of whether the FDC is ready to receive a command. The first command sequence entails outputting three bytes to the FDC and polling the FDC status register 77 each time to be certain it is ready to receive another command byte 30*a*, 30*b*, 30*c*, 30*d*, 30*e*, 30*f*. After this, the seek will take place, with step pulses being issued if required, after which the FDC will interrupt the CPU 30*g*. Then it is necessary to poll the FDC status register 30*h* and thereafter issue a 1-byte command to the FDC to determine the result of the seek operation 30*i*. After this command byte is issued, two result bytes must be read from the FDC and, before each of these bytes is read, the FDC status register must be read to verify that the FDC has a byte of result information ready 30*j*–30*m*. This entire sequence must be performed twice: once for the first seek 30*a*–30*m* and, again, for the second seek 32*a*–32*m***.

Referring again to FIG. 1A, after the sending of at least one step pulse 28, the door open status is again checked 34. If, following the step pulse, the "door open" status is false, it is assumed a new diskette has been inserted and the door closed and, therefore, the new directory and allocation information for the new diskette is read 36. BIOS returns an indication of the most recently read door-open status to the CPU 38. When the CPU learns whether the door-open status is true or false, the CPU can end the routine if the door is closed 42. However, if, after a step pulse is issued, the CPU learns that the door is still open 44, the CPU, if it is desired to detect the insertion of a new disk, will initiate the procedure over again 46. In this way, the entire process of selecting the disk drive 12, polling the door-open status 18, sending a step pulse 28, and polling the door-open status a second time 34, will be repeated until such time as information is returned to the CPU indicating that a new disk has been inserted so that the loop can end 42.

One problem with the system for detecting disk change as depicted in FIGS. 1A and 1B is the amount of time required for every iteration of the loop, particularly, the amount of time required to send a step pulse to the drive 28. Each iteration of the loop depicted in FIGS. 1A and 1B requires dozens of input and output instructions in a complex, time-consuming algorithm which occupies the CPU and other components and prevents these components from performing other functions.

Another problem of the procedure depicted in FIGS. 1A and 1B is that each iteration of the loop results in movement of the head, in response to the step pulse. The head movement is unnecessary in the sense that the head movement is not being done in order to position the head near desired data, but only as an artifact of issuance of the step pulse which is necessary to update the door-open status. Accordingly, a procedure such as that depicted in FIGS. 1A and 1B results in excessive wear on the head and on head positioning apparatus. Furthermore, the BIOS spins the disk drive motor on every iteration 14 in anticipation of a data transfer operation. Thus, there is unnecessary wear on the disk drive.

Related to the problem of unnecessary movement of the drive and head is that head movement, when done frequently enough, causes a "growl" sound. When the head movement is at a slightly lower frequency, the "growl" is replaced by a constant "clicking" sound. These sounds are disconcerting to the user and result in dissatisfaction with the product and unnecessary inquiries and service calls.

Yet another problem in the disk change method depicted in FIGS. 1A and 1B relates to turning on the drive light during spinning 16. During typical execution of a loop of FIG. 1, after the drive light is turned on 16 the rest of the procedure up through the return loop 46 will be accomplished before the drive light turns off. Typically, the return loop 46 will be executed every second or so. Since the drive light will be turned on again before such time as it is turned off, the drive light will remain constantly on while the computer is waiting for a new disk to be inserted and the door to be closed. It is common knowledge among personal computer users that it is inadvisable to insert or remove a floppy disk when the disk drive light is turned on. Thus, while the computer is monitoring the drive for insertion of a new disk (causing the drive light to remain on) the user will be deterred from inserting a disk.

The present invention has addressed the above problems by a method and apparatus which, according to one embodiment, involves moving the head to the outermost cylinder (i.e., track zero) and, thereafter, continuing to send step codes to update the door- open status signal. This is a useful procedure because the typical disk drive includes an electrical lock which prevents head movement in response to a step code if the head is at the outermost cylinder and the direction signal indicates outward movement. The described method could not have been achieved using apparatus available in the past, because the floppy disk controller, during recalibration procedures, will not issue a step pulse in an outward direction once the outermost cylinder is reached. During normal, (non-recalibration) seek operations, the FDC cannot logically be commanded to seek out past track zero. This inability of the FDC to command a seek outward past track zero existed in previous devices despite the fact that the drives included an electric lock to prevent head movement in a direction outward from track zero in response to a step pulse.

The present invention includes achieving the transmission of a step pulse for outward movement from track zero by bypassing the floppy disk controller, using circuitry which can send a step code without using the floppy disk controller. Providing the alternate circuitry for sending such a step code without using the FDC includes providing a proper direction signal so that "direction" is indicated as outward during the issuance of the step code and providing a I/O address or "port" at least one bit of which can be set at the proper value/or driving a step pulse line under control of the CPU (i.e., without using the FDC) and in which this use of the I/O address or "port" does not interfere with any other use it may have in the computer during normal operations.

DETAILED DESCRIPTION OF THE PREFERRED EMBODIMENT

Figure 2:
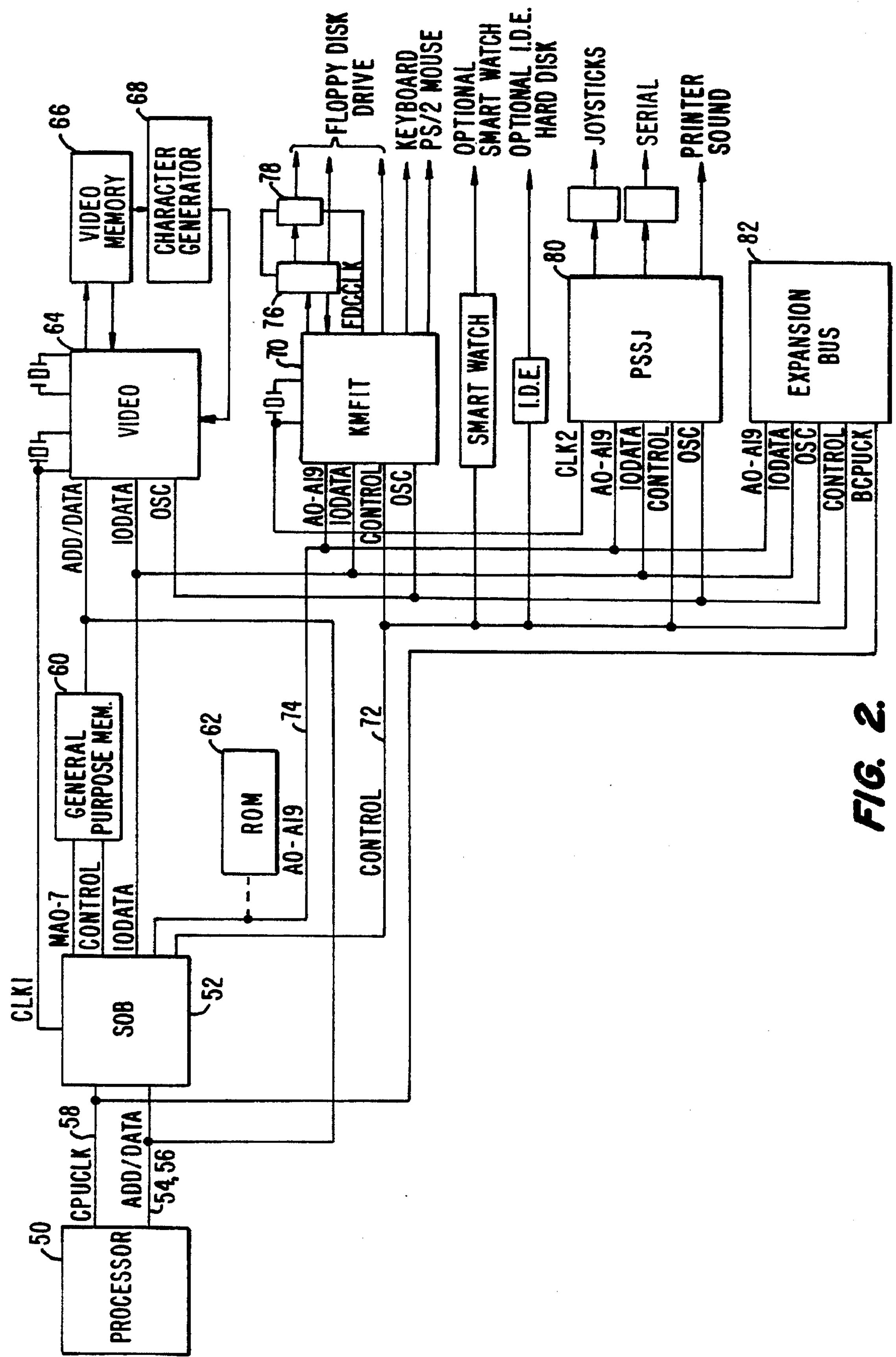
FIG. 2 is a block diagram of a computing device in which the present invention can be implemented.
Figure 3:
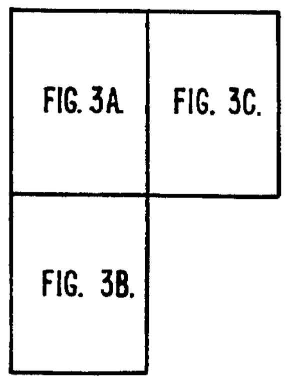
FIG. 3 is a guide to the layout of FIGS. 3A, 3B and 3C.

FIG. 2 shows a block diagram of a computer in which the present invention can be implemented. The present invention can also be implemented in other types of computers and in non-computer apparatus such as word processors. As shown in FIG. 2, the computer has a central processing unit (CPU) which includes a processor 50, such as a Model 8086 16-bit microprocessor available from Advanced Micro Devices (AMD). The processor 50 is connected to a processor interface circuit called the SOB circuit 52. The interface circuit 52 interfaces between the processor 50 and the rest of the system. It is connected to the processor by address/data buses 54, 56, and a clock line 58. The interface circuit 52 provides, to the rest of the system, CPU command and control signals, clock signals, wait state control, data buffers and conversion logic, dynamic random access memory (DRAM) and direct memory access (DMA) control and input/output (I/O) decodes for chip selects of on-board peripherals. In the preferred embodiment, the interface 52 is an application specific integrated circuit (ASIC).

The interface circuit 52 is connected to general purpose memory circuits 60 and read only memory (ROM) 62.

A video circuit 64 is connected to, and can be addressed by, either the interface circuit 52 or directly by the processor 50. The video circuit 64 is preferably a custom ASIC. Its purpose is to generate video signals for a video display. It interfaces with the monitor through an external connector. The video circuit 64 is connected to a video memory 66 and a character generator 68.

A peripheral interface circuit 70 is provided for supporting keyboard interface, a mouse interface, floppy disk support, interrupt controller, and programmable interval timer. Because of these major functions, the circuit 70 is called KMFIT. The KMFIT 70 interfaces with control and address lines 72, 74 generated by the interface circuit 52. The KMFIT circuit is coupled to a disk control circuitry which includes a floppy disk controller 76 and a floppy disk interface circuit 78, as described more fully below. According to one embodiment, the FDC controller is Model 765 Diskette Controller available from Zilog. Another ASIC 80 is provided which contains a parallel printer interface, a serial interface, sound circuitry and a joy stick interface. This circuit is, therefore, termed PSSJ 80. An expansion bus 82 is provided for permitting connection to optional circuitry such as additional memory, modems, and the like.

In the depicted embodiment, the I/O devices are accessed by way of port-mapped I/O. Table I depicts the address range for various items addressable in the I/O port space. The floppy diskette controller occupies addresses 3F0–3F7.

TABLE I

SYSTEM I/O MAP

| Hex Range | Device | Component Name |
|---|---|---|
| 000–00F | DMA controller 1 | SOB |
| 020–021 | Interrupt Controller 1, MasterE | KMFIT |
| 040–047 | Counter/Timer | KMFIT |
| 060–062 | PPI/Keyboard Ports | KMFIT |
| 065 | Planar Control Register | VIDEO II KMFIT PSSJ |
| 066–06F | Mouse Control Registers | KMFIT |
| 081 | DMA Channel 2 Address A16–A19 | SOB |
| 082 | DMA Channel 3 Address A16–A19 | SOB |
| 084 | DMA Channel 0 Address A16–A19 | SOB |
| 0A0 | NMI Mask/NMI Status | SOB KMFIT |
| 0A1 | Interrupt Mask Register | KMFIT |
| 0C0–0C7 | Sound Functions | PSSJ |
| 1F0–1FF | Not Used | |
| 200–207 | Joystick Functions | PSSJ |
| 278–2F7 | Not Used | |
| 2F8–2FF | Serial Port Secondary Address | PSSJ |
| 320–324 | Fixed Disk | SOB |
| 360–36F | Reserved | |
| 370–377 | Not Used | |
| 378–37F | Parallel Printer Port Primary Address | PSSJ |
| 380–3AF | Not Used | |
| 3B0–3BF | Monochrome Display | VIDEO II |
| 3C0–3CF | Reserved | |
| 3D0–3DF | Color/Graphics Monitor Adapter | VIDEO II |
| 3E0–3EF | Not Used | |
| 3F0–3F7 | Floppy Diskette Controller | KMFIT |
| 3F8–3FF | Serial Port Primary Address | PSSJ |
| FFEA | Configuration Write/Read | SOB |
| FFEB | Non-IBM Compatible Write/Read | SOB |
| FFEE | Configuration Write/Read | SOB, KMFIT |

Figure 3A:
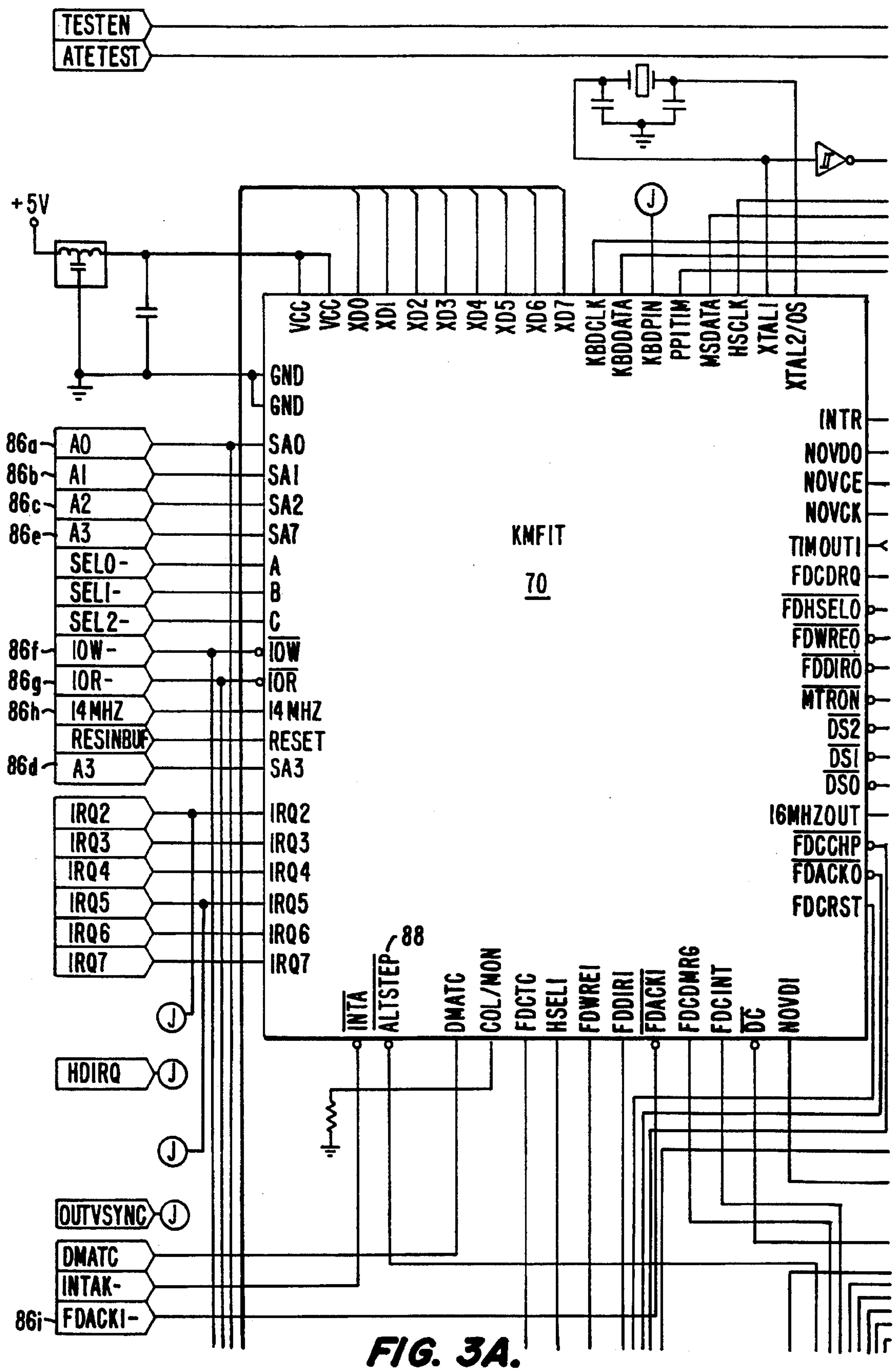
FIG. 3A is a drawing of a first part of a block diagram of those portions of FIG. 2 involved in control of the floppy disk drive.
Figure 3B:
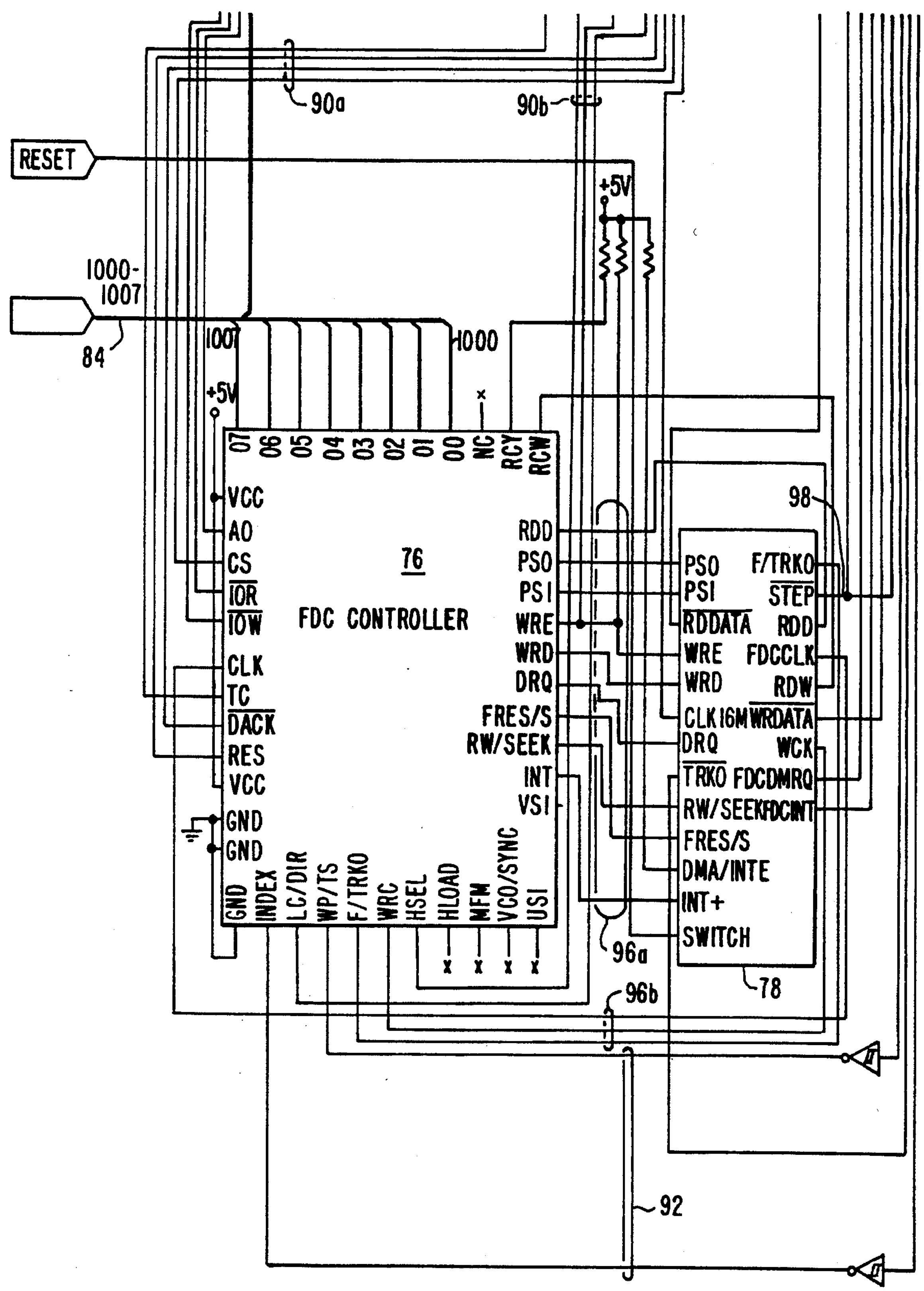
FIG. 3B is a drawing of a second part of the block diagram of those portions of FIG. 2 involved in control of the floppy disk drive.
Figure 3C:
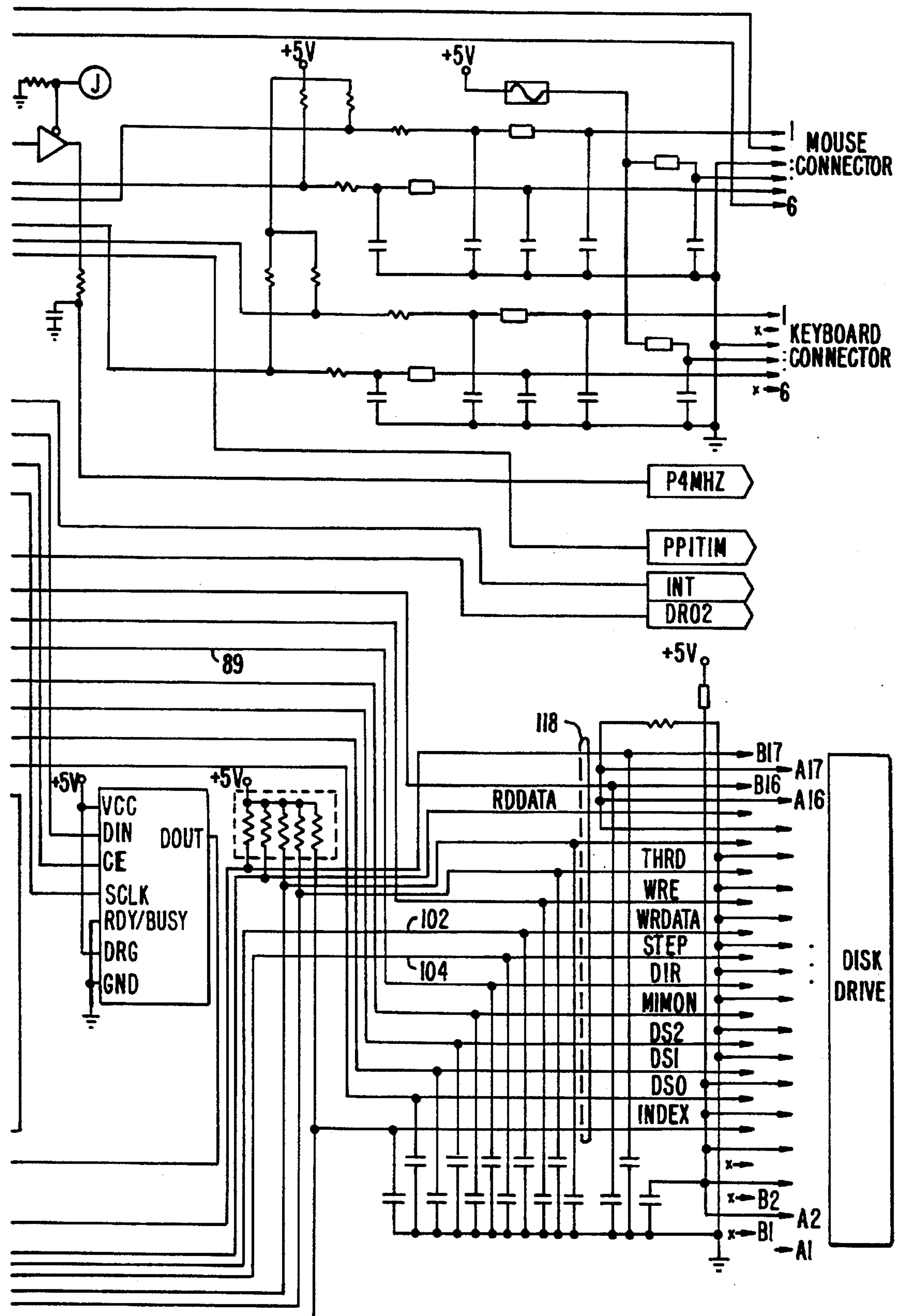
FIG. 3C is a drawing of a third part of the block diagram of those portions of FIG. 2 involved in control of the floppy disk drive.

FIGS. 3A, 3B and 3C depicts the circuitry for controlling the floppy disk in greater detail. As shown on FIG. 3A, KMFIT 70 receives I/O data through I/O data bus 84, I/O addresses through address lines **86*a*–86*e* and control signals through lines 86*e*–86*i*. Additional inputs and outputs of the KMFIT chip 70**, which are less pertinent to the present invention are depicted in Table II. Overbars indicate the signal is active low.

TABLE II

KMFIT INPUTS AND OUTPUTS

| Name | Input/Output | Description |
|---|---|---|
| SA0–SA3, SA7 | Input | System Address |
| A | Input | System Address Decode |
| B | Input | System Address Decode |
| C | Input | System Address Decode |
| $\overline{IOW}$ | Input | I/O Write |
| $\overline{IOR}$ | Input | I/O Read |
| 14MHZ | Input | Clock Signal |
| Reset | Input | System Reset |
| IRQ2–IRQ7 | Input | I/O Device Interrupt Request |
| $\overline{INTA}$ | Input | CPU Interrupt Acknowledge |
| DMATC | Input | DMA Terminal Count |
| COL/MON | Input | Color or Monochrome |
| FDCTC | Output | FDC Terminal Count |
| HSELI | Input | Floppy Drive Head Select |
| FDWREI | Input | FDC Write Enable |
| FDDIRI | Input | FDC Direction |
| FDACKI | Input | Floppy Disk Acknowledge |
| FDCDMRQ | Input | FDC DMA Request Input |

TABLE II-continued

KMFIT INPUTS AND OUTPUTS

| Name | Input/Output | Description |
|---|---|---|
| FDCINT | Input | FDC Interrupt |
| $\overline{DC}$ | Input | Diskette Change |
| INTR | Output | Interrupt Request to CPU |
| NOVDO | Output | Non-Volatile Memory Data Out |
| NOVCE | Output | Non-Volatile Memory Device Select |
| NOVCK | Output | Non-Volatile Memory Clock |
| TIMOUN 1 | Output | Time-Out 1 from 8254 |
| FDCDRQ | Output | FDC DMA Request Output |
| $\overline{FDHSEL0}$ | Output | Floppy Drive Head Select |
| $\overline{FDWREO}$ | Output | Floppy Drive Write Enable |
| FDDIRO | Output | Floppy Drive Direction |
| $\overline{MTRON}$ | Output | Floppy Drive Motor Enable |
| $\overline{DS0–DS2}$ | Output | Floppy Drive Select |
| 16MHZ OUT | Output | Clock Signal |
| $\overline{FDCCHP}$ | Output | FDC Select |
| FDACKO | Output | Floppy Disk Acknowledge |
| $\overline{FDCRST}$ | Input | FDC Reset |
| GND | | Ground Potential |
| VCC | | VCC Potential |
| XD0–XD7 | (Input/Output) | Data Bus |
| KBDCLK | (Input/Output) | Keyboard Clock |
| KBDDATA | (Input/Output) | Keyboard Data |
| TESTPIN | Input | Test Pin |
| PPITIM | Output | 8254 Timer Interface to Speaker |
| MSDATA | (Input/Output) | Mouse Data |
| MSCLK | (Input/Output) | Mouse Clock |
| XTAL1 | | Input |
| XTAL2/OS | | Output |

The open collector output pins of KMFIT which are of particular importance to the present invention are $\overline{ALTSTEP}$ 88, which is used to generate a step pulse signal for the disk drive, without using the FDC, and direction signal 89 which is output directly to the disk drive 94.

AS shown in FIG. 3B FDC circuit 76 receives I/O data from I/O data bus 84. The FDC circuit 76 receives control signals **90*a*, 90*b* from KMFIT 70. The FDC outputs control signals 92 directly to the floppy disk drive 94. A number of floppy disk drives can be used in connection with the present invention. An example of a diskette drive which is usable in the present invention is Model MP-F 11W-72D available from Sony Corporation. This model provides two heads movable among 80 cylinders for a total of 160 tracks. The FDC 76 outputs other control signals 96*a*, 96*b* to the floppy disk interface circuit 78 (FDSL). Input and output signals for the FDC 76** are summarized in Table III.

TABLE III

FDC INPUT/OUTPUT SIGNALS

| Name | Input/Output | Description |
|---|---|---|
| $A_0$ | Input | Data/Status Register Select |
| $\overline{CS}$ | Input | Chip Select |
| $\overline{IOR}$ | Input | Read Control Signal |
| $\overline{IOW}$ | Input | Write Control Signal |
| CLK | Input | Clock |
| $\overline{TC}$ | Input | Terminal Count |
| $\overline{DACK}$ | Input | DMA Acknowledge |
| RES | Input | Reset Places FDC in Idle State |
| $V_{cc}$ | | D.C. Power |
| GND | | Ground |

TABLE III-continued

| FDC INPUT/OUTPUT SIGNALS | | |
|---|---|---|
| Name | Input/Output | Description |
| INDEX | Input | Index Indicates the beginning of a disk track |
| LC/DIR | Output | Determines direction head will step in Seek mode |
| WP/TS | Input | Senses Write Protect status in Read/Write mode |
| F/TRKO | Input | Senses FDD fault condition in Read/Write mode |
| WRC | Input | Write Clock |
| HSEL | Output | Head Select |
| HLOAD | Output | Causes Read/Write head to contact diskette |
| MFM | Output | MFM Mode |
| VCO/SYNC | Output | VCO Sync |
| RDD | Input | Read data from FDD containing clock and data bits |
| PS0 | Output | Precompensation (Pre-Shift) |
| PS1 | Output | Precompensation (Pre-Shift) |
| WRE | Output | Write Enable |
| WRD | Output | Write Data Serial clock and data bits to FDD |
| DRQ | Output | Data DMA Request |
| FRES/S | Output | Step Pulses to Move Head |
| RW/SEEK | Output | Read Write/Seek |
| INT | Output | Interrupt Request Generated by FDC |
| RDY | Input | Indicates FDD is Ready to Send or Receive Data |
| RDW | Input | Data Window used to sample data from FDD |

The floppy disk interface circuit 78 outputs STEP and write data (WRDATA) signals 98, 102 to the disk drive 94. Other input and output signals for the interface circuit 78 are summarized in Table IV. Input and output signals for the floppy disk drive 94 are summarized in Table V.

TABLE IV

| FDSL INPUT/OUTPUT SIGNALS | | |
|---|---|---|
| Name | Input/output | Description |
| PS0 | Input | Write Precompensation status |
| PS1 | Input | Write Precompensation status |
| RDDATA | Input | Serial Data from FDD |
| WRE | Input | Write Enable |
| WRD | Input | Serial Data from FDC |
| CLK 16M | Input | Clock Signal |
| DRQ | Input | FDC DMA Request |
| TRK0 | Input | From FDD, indicating head is on track 0 |
| RW/SEEK | Input | Specifies seek mode when high |
| FRES/S | Input | Step pulses to move head to another cylinder |
| DMA/INTE | Input | DMA request and FDC interrupt enable |
| INT+ | Input | Interrupt request generated by FDC |
| SWITCH | Input | 0 = Low Density Drive<br>1 = High Density Drive |
| F/TRK0 | Output | To FDC, indicating head is on track 0 |
| STEP | Output | Moved head of FDD |
| RDD | Output | Serial Data from FDC |
| FDCCLK | Output | If SWITCH = 0, then CLK16M/4<br>If SWITCH = 1, then CLK16M/2 |
| RDW | Output | Read Data Window |
| WRDATA | Output | Serial Data to FDD |
| WCK | Output | If SWITCH = 0, period = 2 us,<br>250 ns pulse<br>If SWITCH = 1, period = 1 us,<br>250 ns pulse |
| FDCDMRQ | Output | DRQ delayed by 1.0 usec. |
| FDCINT | Output | Interrupt Request |

TABLE V

| Name | Input/Output | Description |
|---|---|---|
| DC- | Output | Diskette Change |
| RDDATA- | Output | Read Data |
| TRK0- | Output | Track 0 |
| WRE- | Input | Write Enable |
| WRDATA- | Input | Write Data |
| STEP- | Input | Step Pulse |
| DIR- | Input | Direction |
| MTRON- | Input | Motor Enable |
| DS0–DS2- | Input | DRWE Select 1, 2 |
| INDEX- | Output | Index Pulse |

AS shown in FIGS. 3A, 3B and 3C, step signal 104 which is issued to the disk drive 94 is a logical OR combination of the STEP signal 98 issued by the FDSL and the ALTSTEP signal 88 issued by KMFIT 70. In the preferred embodiment, the combined signal 104 is obtained by dot ORing the step signal 98 and the ALTSTEP signal 88. A gate or other logic circuitry could also be provided for this purpose.

Figure 4:
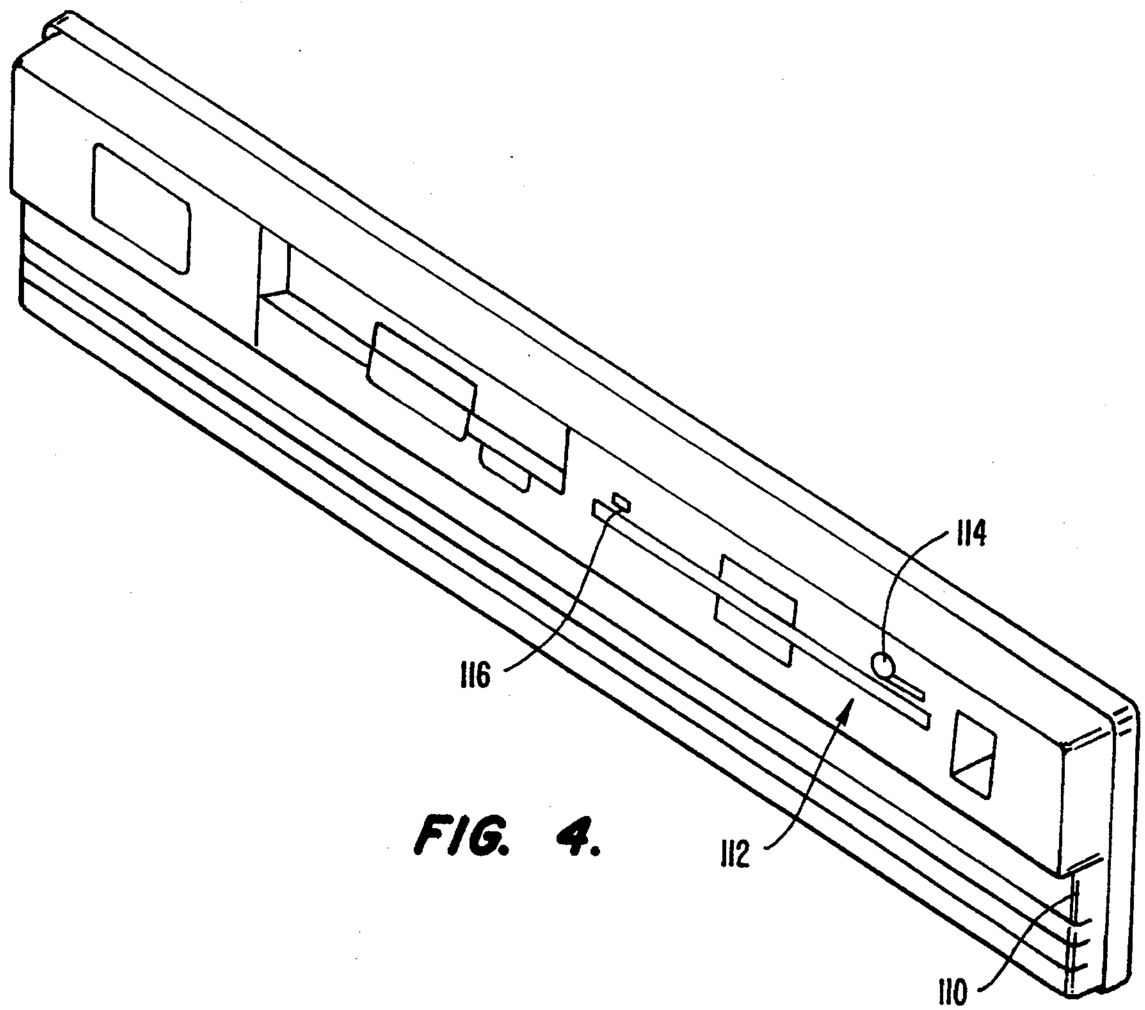
FIG. 4 is a perspective view of a front panel of the computer usable in accordance with the present invention.

FIG. 4 depicts a front panel of a computer 110 including a floppy disk drive front panel 112. The floppy disk drive front panel 112 includes a drive door 114 and a drive-active indicator light 116. The door 114 is movable from the open configuration depicted in FIG. 4 to a closed configuration. A floppy disk can be inserted into the drive when the door 114 is in the open configuration.

In order to issue a step pulse for outward movement as described above, it is necessary to provide the direction signal 89 at the desired value when the step pulse is issued. All of the signals on the floppy disk bus 118 are open collector signals. In the case of open collector signals, a signal source either drives a line low or, to reflect the opposite sense, does not drive a line low and allows a pull up resistor to pull the line high. The direction signal 89 is configured such that if the direction signal is low, the head motion is inward and if the direction signal is high the motion is outward. Since the direction signal is an open collector signal, if no circuit drives it low during a step pulse, the direction will be high, because of the action of the pull up resistor, indicating an outward direction.

The active level for the step pulse 104 is low. Since the signal is an open collector signal, another open collector driver can be connected in parallel to provide an alternate step pulse. It is for this reason that ALTSTEP signal 88 and step signal 98 can be connected by dot ORing the signals.

As noted above, the present invention includes providing an I/O address or "port" which can be used to drive the ALTSTEP line at the proper level during issuance of a step pulse without interference with any other use the port may have in the computer during normal operations. In the preferred embodiment, the address or port which is used for the ALTSTEP signal 88 is 0FFEEh and specifically, bit 7 of this port is used. Bit 7 of this address is not used for other purposes which could interfere with the function described.

Because the hardware configuration described above provides a way for issuing a step pulse without using the FDC controller (namely by issuing an $\overline{\text{ALTSTEP}}$ signal directly under control of the processor, via the KMFIT, over line 88) it is possible to provide a process for determining whether a new diskette has been inserted (i.e., whether the drive door has been closed after an opening of the drive door) which is simpler and requires fewer instructions and less processor time than previous methods.

In operation, the circuitry of FIGS. 3A, 3B and 3C permits control of the disk drive 94 in two ways. According to the first method of control, signals from the processor are received in the KMFIT 70 and also in the FDC 76. KMFIT provides control signals to the FDC 76 which in turn provides data and control signals to the floppy disk interface circuit 78. In response, the floppy disk interface circuit 78 and the KMFIT 70 provide output signals 118 to the disk drive 94. In particular, the direction signal is provided to the KMFIT 70 overlying 89 to the disk drive 94. The FDC 76, in response to control signals from the processor and KMFIT 70, issues a seek signal which is received by the floppy disk interface circuit 78. In response, the floppy disk interface circuit 78 issues one or more step pulses on line 98 for transmission to the disk drive on line 104. During this method of controlling the disk drive the $\overline{\text{ALTSTEP}}$ signal 88 is maintained inactive, i.e., at a high level. Because the step pulse signal line 104 carries an open collector signal, it will remain high as long as there is no circuit driving it low. Thus, although the $\overline{\text{ALTSTEP}}$ line 88, which is dot ORed with the step output line 98, remains high, when the step output line 98 is driven low, the resultant signal on the disk drive input line 104 will be low, i.e., active.

In the second mode of operation, a step pulse is issued to the disk drive 94 without using the FDC controller. According to this mode of operation, the KMFIT does not drive the direction line 89 and the direction line, being an open collector signal, is maintained at the high level indicating outward direction. It is for this reason that the present invention can provide for outward movement of the head without requiring the processor to issue a command setting the direction line signal level (and thus without the need for assigning an I/O port for this purpose or using an additional pin of the KMFIT). The processor 50 issues a command (via interface circuit 52) to the KMFIT 70 including issuance of an I/O address and I/O data. The address is the I/O port address. The data include 8 bits of data issued over lines IODO through IOD7. Bit 7 (IOD7) has been set low level by the processor. The value of this bit is sent by the KMFIT to the pin which is connected to line 88. In this way, the $\overline{\text{ALTSTEP}}$ signal 88 is driven low. Because the FDC is not being used to control the disk drive 94, the step signal 98 output by the floppy disk interface circuit 98 is maintained high (since this is an open collector signal). When the low $\overline{\text{ALTSTEP}}$ signal 88 is ORed with the high step signal 98, the result is to drive the input step signal 104 to a low (i.e., active) level. In this manner, the processor 50 can directly control the direction and issuance of a step pulse without using the FDC. Although the KMFIT performs a number of functions, the function described above is a type of decoding and latching function, i.e., receiving address and/or data signals and outputting a signal in response. Any circuitry which provides this function could be used in the present invention. Furthermore, it would be possible for the output lines from the processor 50 to directly control the signal on line 88 without intervening circuitry, such as by using a processor having latched output pins. Also, it would be possible to use a simpler decode signal, such as one which remained active during only part of a processor cycle, if it met the minimum pulse width requirement of the disk drive.

In one embodiment, address and control signals are decoded, and when they match a certain pattern such that the decoder output becomes active, the value of one or more of the data signals is stored in a latch. The $\overline{\text{ALTSTEP}}$ signal is such a latched signal. It will remain at the same level after the processor cycle ends. To pulse $\overline{\text{ALTSTEP}}$, it is latched active in one cycle and latched inactive in a later cycle.

Figures 1, 1A:
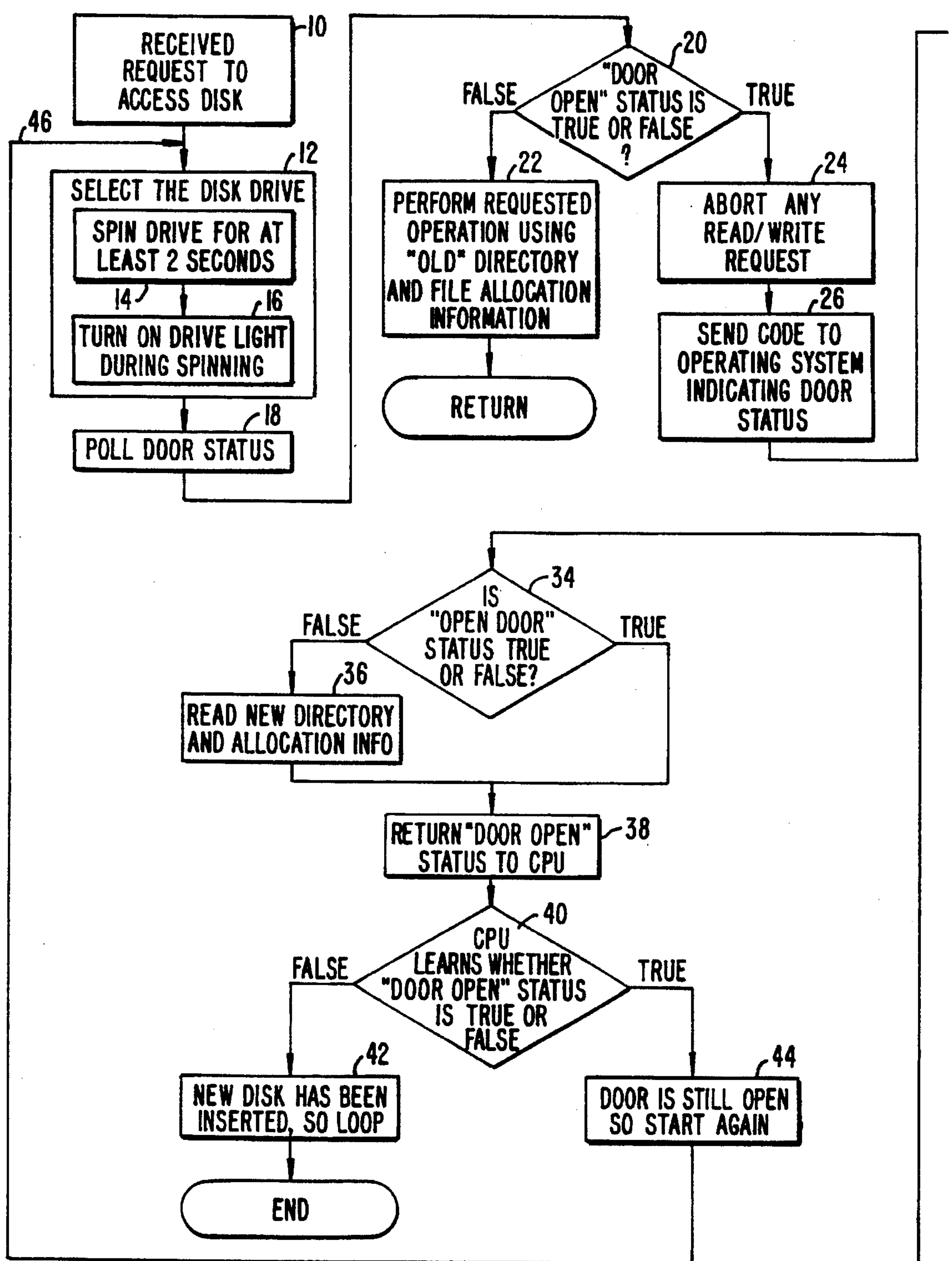
FIG. 1 is a guide to the layout of FIGS. 1A and 1B.
FIG. 1A is a drawing of a first part of a flow chart of a diskette change detection process according to previous devices and methods, with enclosing boxes showing generalized process descriptions and enclosed boxes showing more specific process steps.
Figure 5:
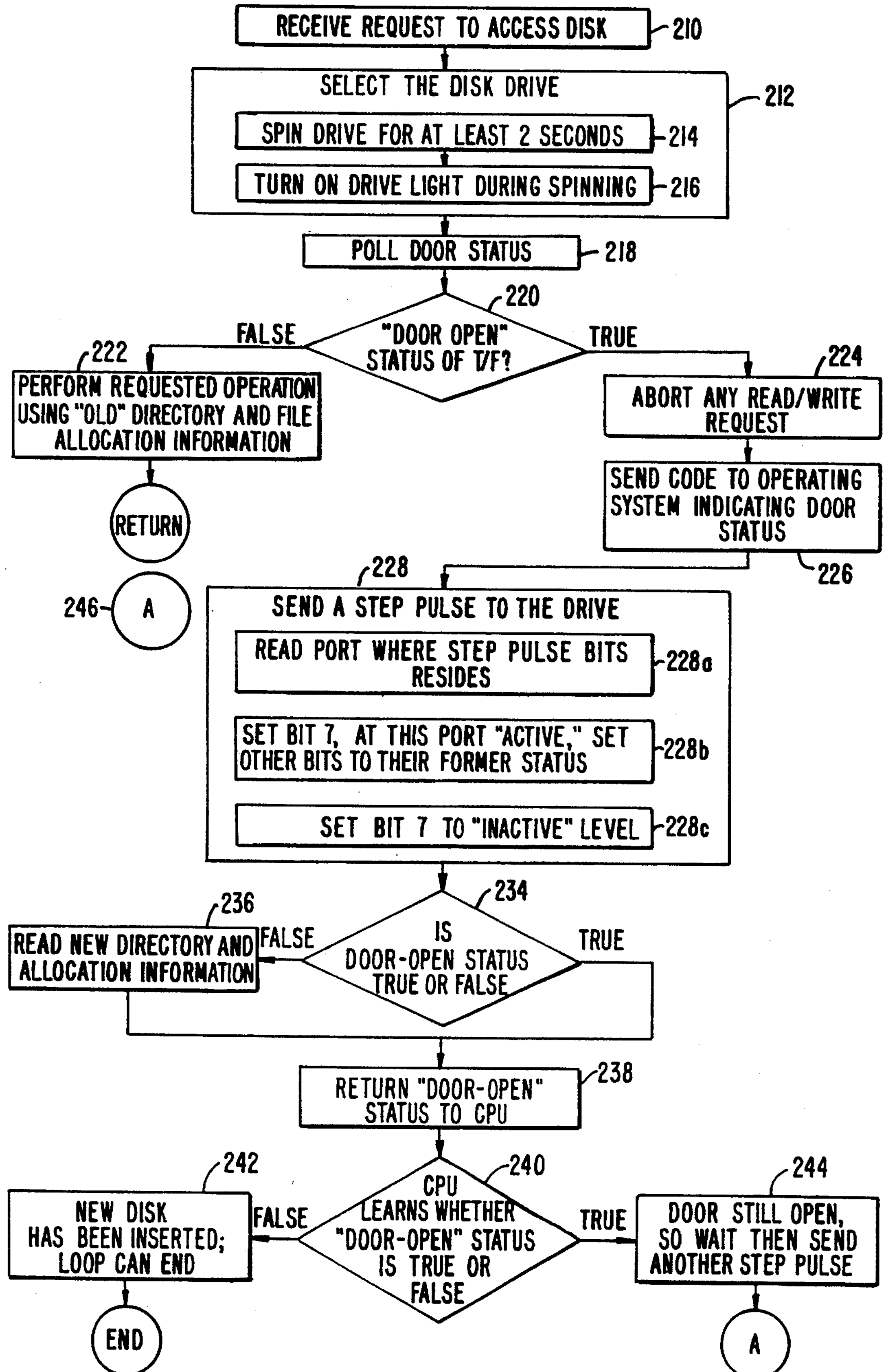
FIG. 5 is a flow diagram of a process according to one embodiment of the present invention.

FIG. 5 depicts the steps of a method generally corresponding to the method of FIG. 1, but using the present invention. As with the method of FIG. 1, a request to access the disk is received 210. The FDC selects a disk drive 212 causing the drive to spin 214 and turning on the drive-active indicator light 216. The door-open status is polled 218. If the door is closed, the requested operation is performed 222. Otherwise, any read or write requests are aborted 224 and a status code is sent to the operating system 226. Next, a step pulse is issued 228, following which, the door-open status is rechecked 234 and, if the door is now closed, the new directory and file allocation information are read 236. Afterwards, the door-open status is returned to the CPU 238. If the CPU determines that the door is now closed, the loop ends 242. Typically, the aborted read/write request will be retried at this point. If the drive door is still open, another iteration of the loop is performed 246.

Figure 1B:
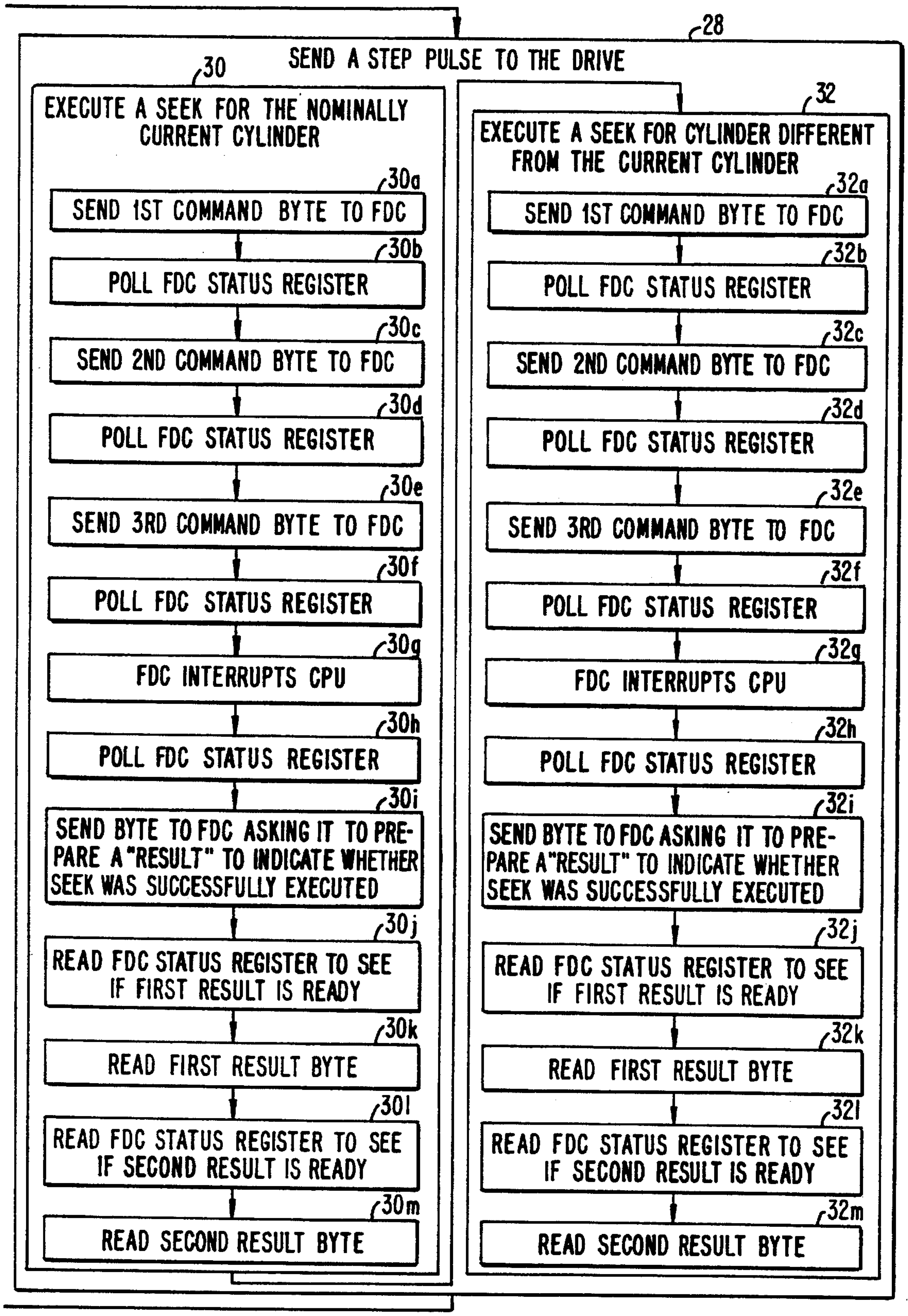
FIG. 1B is a drawing of a second part of the flow chart of a diskette change detection process according to previous devices and methods, with enclosing boxes showing generalized process descriptions and enclosed boxes showing more specific process steps.

There are a number of differences between the method of FIG. 5 and the methods of previous devices such as that shown in FIGS. 1A and 1B. One major difference is the decreased complexity of the method for issuing a step pulse seen by comparing block 28 of FIG. 1 with block 228 of FIG. 5. In block 28, dozens of instructions are required in order to issue a step pulse. In the method of FIG. 5, only three instructions are required. First, all of the bits in the port where the step pulse resides are read 228a. In the preferred embodiment, this is port 0FFEEh. This step is conducted in order to determine the status of the bits other than the bit which is used to generate the $\overline{\text{ALTSTEP}}$ signal (i.e., bits 0–6). Next, all bits in the port are set **228*b*. The bit which will be used to generate the $\overline{\text{ALTSTEP}}$ signal (in the preferred embodiment this is bit 7) is set at the "active" level. All other bits are set to their former level (which was determined in step 228*a***).

Next, all bits in the port are set in a manner identical to that of step **228*b* except that the bit which was responsible for sending the $\overline{\text{ALTSTEP}}$ signal is now set at the "inactive" level 228*c*. Thus, in contrast to the method of FIG. 1, the method shown in FIG. 5 is simpler and requires less time to execute. As an example, comparing execution of the issuance of the step pulse on two machines, one of which is configured and operates as described above for previous devices and the other configured and operating as shown in FIGS. 2–5**, previous devices typically require about 100 microseconds for issuance of a step pulse while the present invention will require about 5 microseconds.

Another difference between the method of FIG. 1 and the method of FIG. 5 is that the method of FIG. 1 requires the issuance of two seek commands in order to ensure issuance of at least one step pulse. This requirement is imposed because the manner of operation of a floppy disk controller. As noted above, a floppy disk controller will not issue a step pulse if the target cylinder is the same as the cylinder where, according to information available to the BIOS, the head is indicated as residing. According to the present invention, issuance of two seek commands is unnecessary. Because the FDC is bypassed in the present invention, it is possible to issue a step pulse regardless of the value of target and head locations. Accordingly, in the present invention, a seek command is not issued by the FDC and therefore it is not necessary to issue two seek commands in order to generate a step pulse.

A further difference between the method of FIG. 1 and the method of FIG. 5 relates to the size of the iteration loop. In the method of FIG. 1, the disk is exclusively controlled through the FDC. The CPU does not directly control head movement, issuance of step pulses, etc. For this reason, the loop returns 46 to the operations performed by the FDC, namely the selection of a disk drive 12. Thus, each iteration of the loop depicted in FIGS. 1A and 1B involves not only issuance of a step pulse but also selection of a disk drive and an additional polling of the door-open status.

In contrast, the method depicted in FIG. 5 does not involve using the FDC in order to issue a step pulse. Rather, the step pulse is initiated directly using the CPU (via the KMFIT chip, in the preferred embodiment). Accordingly, the loop return 246 is to the block 228 which sends a step pulse to the drive. Thus it is not necessary that, on each iteration, the FDC selects the disk drive. For this reason, the drive motor will not necessarily be spun for two seconds during each loop iteration, and drive motor wear can be reduced. Furthermore, the drive indicator light will not be continually illuminated, and thus users will not be unnecessarily deterred from inserting a disk.

Figure 6:
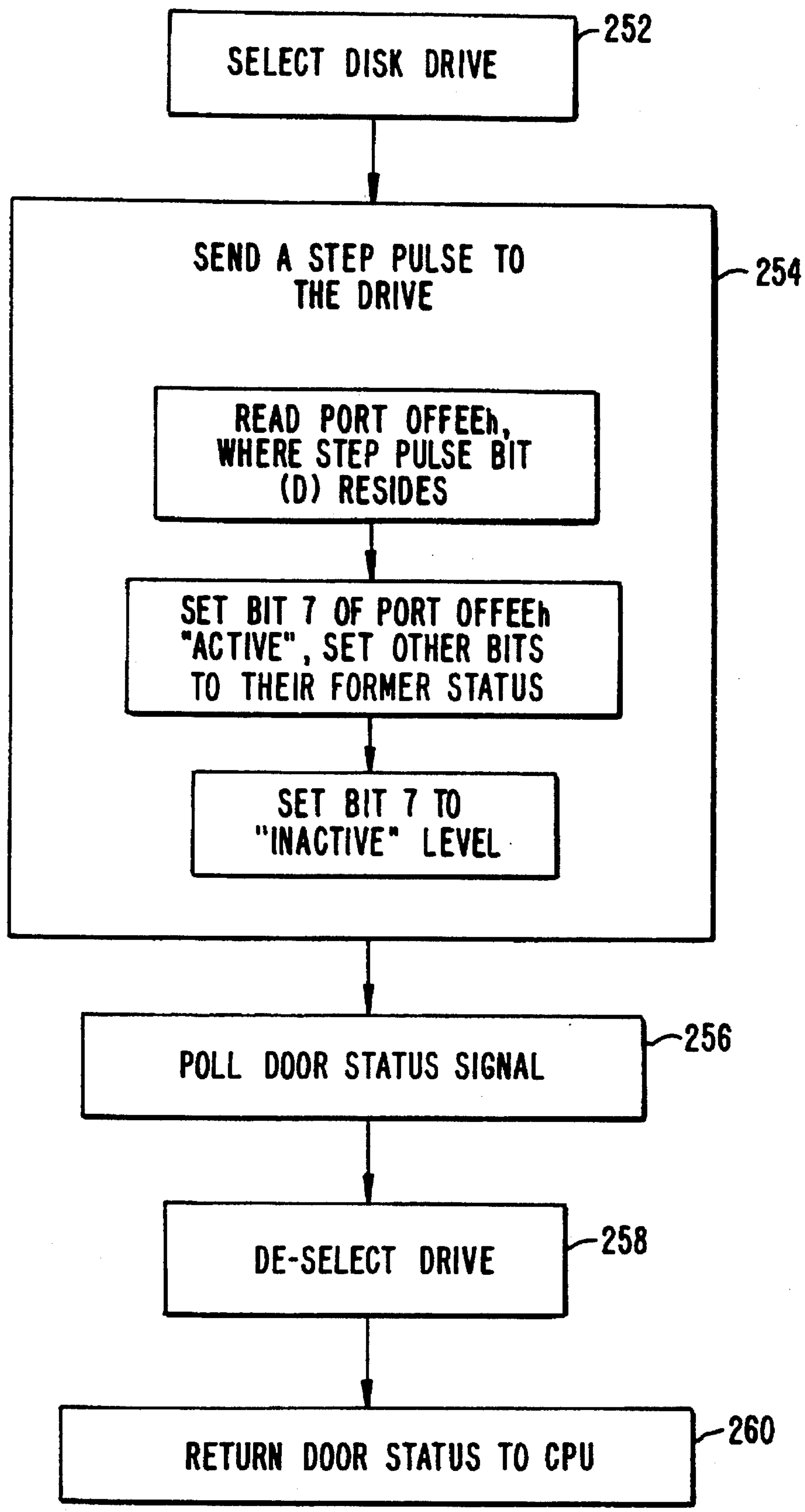
FIG. 6 is a flow diagram of another embodiment of the present invention.

As noted above, FIG. 5 depicts a process generally similar to the process of FIG. 1 which can be initiated in response to a read or write request. The present invention can also be implemented in the context of other types of commands. FIG. 6 depicts a method for determining door-open status. The method of FIG. 6 is not necessarily implemented in response to a read or write request but can be initiated in response to a request for determining door-open status. According to FIG. 6, the disk drive is first selected 252 and a step pulse is then sent to the drive 254. The procedures for sending the step pulse 254 are identical to those for sending a step pulse 228 according to the method of FIG. 5. Following the sending of a step pulse 254 the door-open status signal is polled 256, the status is returned to the CPU 258 and the drive is deselected 260. Typically the process depicted in FIG. 6 can be executed on a machine such as that depicted in FIGS. 2–3 in about 10 microseconds or less.

Figure 7A:
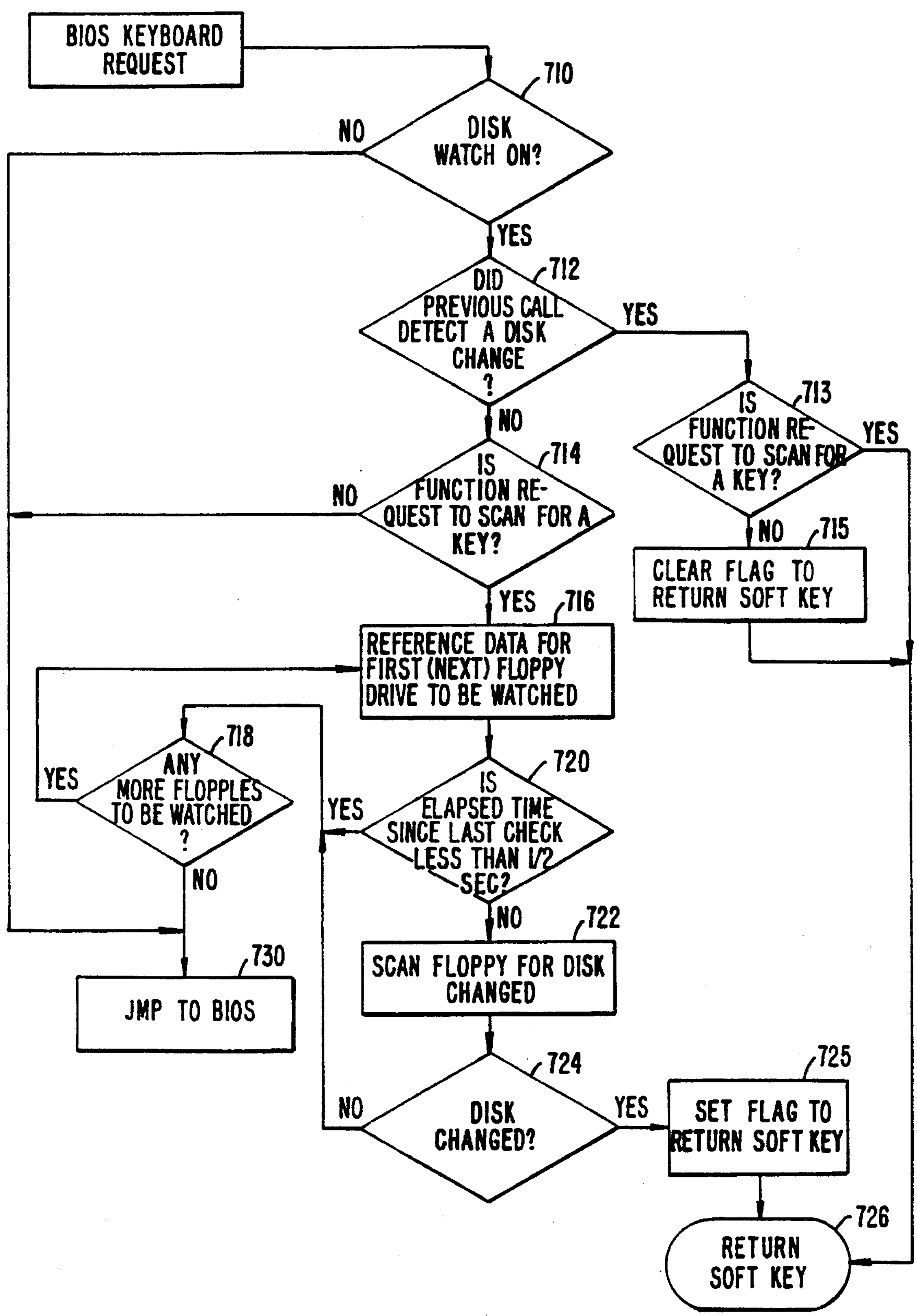
FIG. 7A is a flow diagram of a monitor process according to an embodiment of the present invention.
Figure 7B:
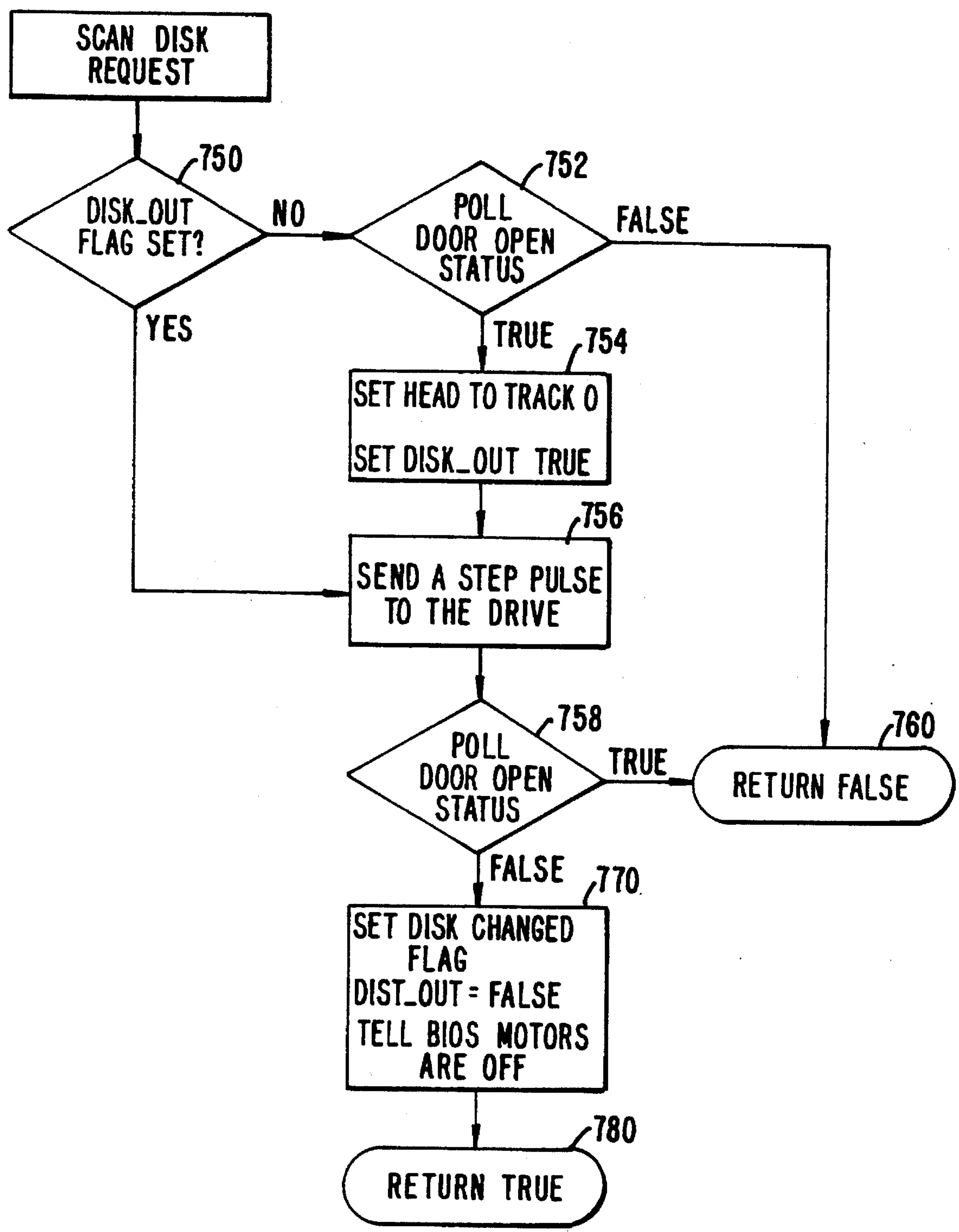
FIG. 7B is a disk-change scan process according to an embodiment of the present invention.

FIGS. 7A and 7B are flow diagrams of a process for watching one or more floppy disk drives for insertion of a diskette and generating a "soft key" if a diskette insertion is detected. A diskette insertion is detected when it has been detected that a drive door has been opened and, subsequently, closed. In a typical Disk Operating System ("DOS")-based configuration, this will be included in an "interrupt 16" handler. An application program calls a "disk watch" routine to initialize the variables used in the process depicted in FIG. 7A. Initialization includes, for example, setting flags to indicate which drives are to be watched and initializing the "Disk Out" (or "Door Open") flag to "False".

An application program can use the disk watch process, e.g., when displaying a message requesting that the user insert a new diskette. As discussed above, prior to the invention, when a message was displayed instructing the user to insert a new diskette, the user had to respond to the message by means other than closing the drive door, such as via the keyboard, mouse or other user input device (referred to as activating a "hard key") to manually indicate that the requested action has been completed. The process depicted in FIG. 7A generates a "soft key" which will automatically respond to the message whenever a new diskette is inserted. A soft key is a software simulation of the activation of a hard key, such as by causing data to be placed in a location (e.g., a keyboard buffer or mouse port) where such data would normally be created as the result of activation of a hard key.

An application could also use the process described in FIG. 7A to update a screen display when a new disk is inserted by registering a "soft key" that corresponds to an "update screen" command. With the disk watch software in place, if the user inserts a new diskette, the "update screen" command will be generated by the disk watch software and the user's screen will be automatically updated to reflect insertion of the new diskette. These two examples demonstrate the use of the process described in FIG. 7A and are not meant to be exhaustive. There are many other ways the disk watch process could be utilized in an application program that deals with removable media, as will be apparent to those skilled in the art.

FIG. 7A shows the steps taken whenever a program makes a call to read from or scan the keyboard, according to one embodiment of the invention. In step 710 a flag is checked to see if the "disk watch" process has been activated by an application program. If not then control is passed to the BIOS code in step 730 to carry out the keyboard request. If the disk watch is on, then step 712 checks to see if the most recent previous call to scan or read the keyboard detected a disk change. This will be indicated by the status of a "soft key return" flag. If so, then step 713 checks to see if the function request is to scan for a key from the keyboard. If the function request is for a scan, control goes to step 726 where the soft key is returned. Return of the soft key effectively responds to a message, indicating to the application program that a diskette has been inserted, as noted above. If the function request is to read a key from the keyboard, step 715 will clear the flag that indicates the "soft key" should be returned on the next call. The soft key is then returned to the calling application in step 726.

If, in step 712, the previous call had not detected a disk change, then in step 714 a check of the function request is made to determine if the request is to scan the keyboard. If it is not, then control is passed to the BIOS code to carry out the request in step 730. Otherwise, steps 716–724 check each floppy drive to be watched for a disk change.

Step 716 sets variables to reference a specific floppy drive that an application has requested be watched. A check is made in step 720 to determine how much time has elapsed since this drive was last checked. If the time is less than a predetermined amount of time, such as ½ second, then the process skips this drive by going to step 718. If the elapsed time is greater than ½ second, then control goes to step 722. In step 722, a call is made to scan the floppy drive to see if a new disk has been inserted. This process is depicted in FIG. 7B. As described below, the process of FIG. 7B returns a result of "TRUE" or "FALSE" with "TRUE" indicating there has been a disk change and "FALSE" indicating no disk change.

In step 724, the results of the process of FIG. 7B are evaluated and subsequent steps are taken, depending on those results. If the scan indicates that no new disk has been inserted then control goes to step 718 where it is determined if there are any more drives to be watched. If no more drives are to be watched, then control is passed to the BIOS code to carry out the request in step 730. Otherwise, control loops to step 716 to set up variables to reference the next floppy drive to be watched and the process repeats for the next drive. If step 724 finds that a new disk has been inserted in a drive then a flag is set 725 to indicate the "soft key" should be returned on the next call and the "soft key" is returned 726. The program that calls the BIOS to retrieve a key, will receive the "soft key" just as if it had been generated manually by the user, if a disk change has occurred on a watched drive. The program calling this routine gets a "soft key" that has the same return value that would have been generated by calling the BIOS routine, had a key been depressed on the keyboard. If there has been no disk change on any watched drive, the routine of FIG. 7A executes a jump to BIOS 730. Typically, the application will continue generating keyboard scan requests until there is a response (either soft key or hard key) to the scan request or until interrupted. Thus, effectively, when the computer displays a message requesting a disk change, it will repeatedly perform the process of FIG. 7A until a new disk is inserted.

FIG. 7B details the process referred to above in step 722. FIG. 7B shows the steps carried out by the process to scan a single floppy drive and return TRUE if a new disk has been inserted in the drive. This routine makes use of a flag "disk-out" to keep track of the status of the drive door between calls. The "disk-out" flag is initially set to FALSE for each drive to indicate that the door is closed. When the process is called to scan a drive the "disk-out" flag is checked in step 750. If the "disk-out" flag is TRUE, the process goes to step 756. If the "disk-out" flag is FALSE, then the process must detect door open followed by door closed, in order to return TRUE for a new disk inserted. Step 752 polls the actual door open status of the drive using the hardware, as described above. If the door is not open, then the process returns FALSE in step 760 indicating that the media has not been removed and subsequently inserted. If step 752 determines that the door is now open, then control goes to step 754. Step 754 calls the BIOS to move the head to track zero in order to avoid further head movement and clicking sounds on subsequent calls. Step 754 also sets the "disk-out" flag to TRUE so subsequent calls will only look for the door to be closed. Control then passes to step 756.

Once the "disk-out" flag has been found to be TRUE then step 756 sends a step pulse to the drive so that the door open status may be updated and read. Step 758 polls the drive to read the door open status. If the door open status is TRUE, then control goes to step 760 where the process returns FALSE indicating there has been no new disk inserted, since the door is still open. If the door is closed in step 758, then a new disk has been inserted and control goes to step 770. In step 770, a "disk changed" flag is set so the next BIOS call to access the drive will correctly return the changeline status. The "disk-out" flag is set back to FALSE, and variables are set to indicate to the BIOS code that the floppy drive motors are off, in order to avoid "not ready" errors from subsequent BIOS calls. Then, in step 780, the process returns TRUE to the caller.

Figure 8:
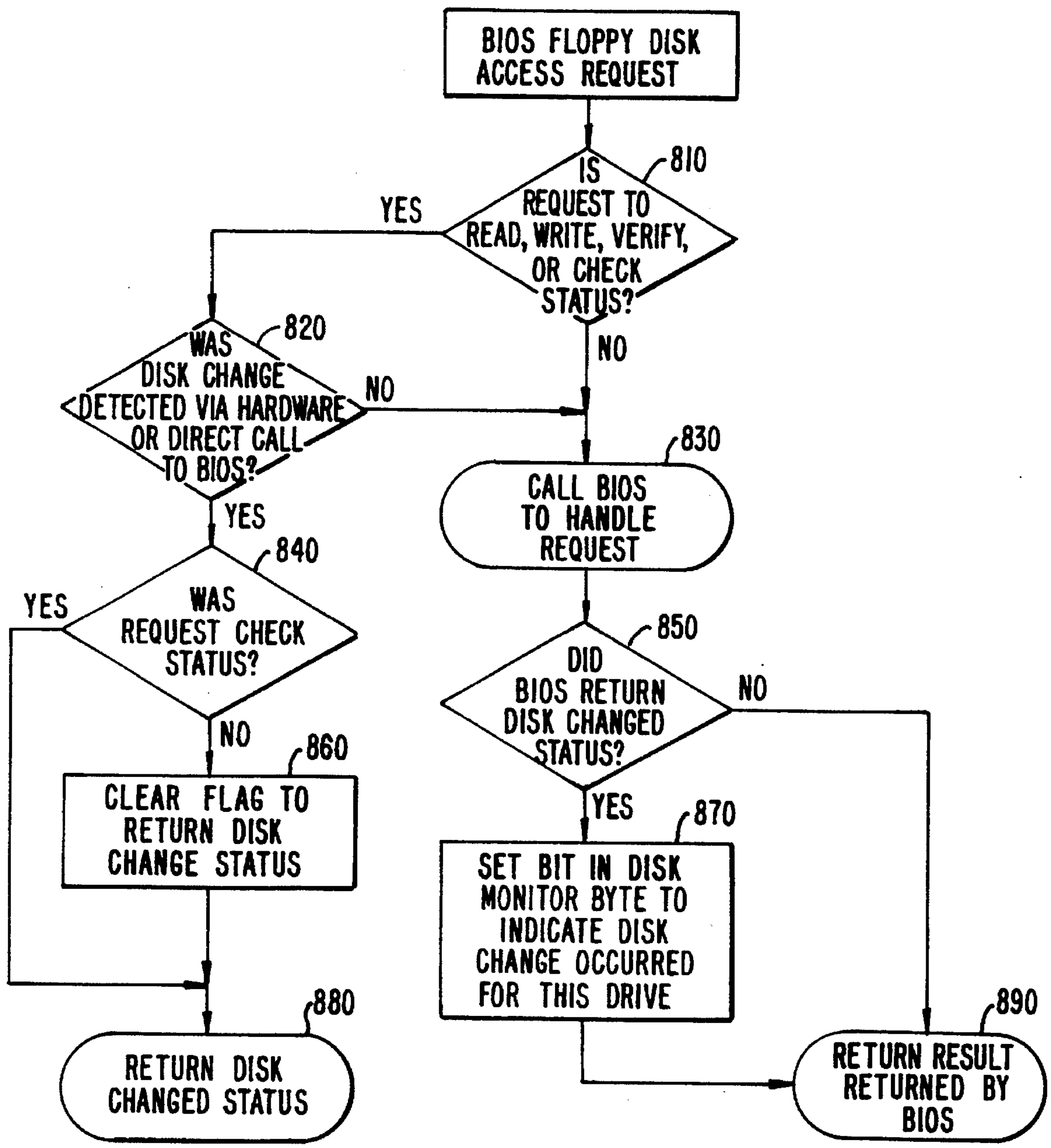
FIG. 8 is a flow diagram of a process to intercept BIOS requests according to an embodiment of the present invention.

FIG. 8 shows a process for intercepting requests to the BIOS code to access a floppy drive. In a typical DOS-based computer configuration, this will be included in an "interrupt 13" handler. There are two reasons for intercepting these calls. The operating system depends on a status return from the BIOS whenever the drive door has been opened and then closed. Since the process for watching for diskette insertion depicted in FIGS. 7A and 7B uses the hardware to communicate with the drive, the BIOS will not see the changeline from the drive (i.e., will not be informed of a disk change when such is detected by the process of FIG. 6 or FIG. 7A) and will not return this information to the operating system. In order to avoid this problem, a flag is set whenever the program detects the changeline status without sending the information to the operating system. The process shown in FIG. 8 will return the changeline status on the next call the operating system makes to access the drive.

The other reason for intercepting the floppy drive access calls is to implement a "disk monitor" function for the application program. This process allows the application program to register or designate a status byte, such as a specified byte of memory, to be updated whenever the changeline status is detected for a floppy drive. The application program can use this information to alert itself that there may be a different diskette in the drive from the previous time it called or accessed the drive, even if a different application has accessed the drive in between calls.

In FIG. 8, when a request is received to access a floppy drive, a check is made in step 810 to see if the request is to read, write, verify, or check status. These are the calls that may return the changeline status. If the request is one of these, then in step 820 the "disk changed" flag is checked to see if the changeline status needs to be returned from a previous disk access. This is the flag that is set by the scan disk routine depicted in FIG. 7B. If the "disk changed" flag is not set, control goes to step 830. If the flag is set, then the changeline status must be returned. Control goes to step 840 where the request is checked to determine if it was a "check status" request. If the request was to check status then control goes to step 880 and the flag is left set. Otherwise, the flag is cleared in step 860. The changeline status is returned in step 880.

If the request checked in step 810 was not read, write, verify, or check status, or if the "disk changed" flag checked in step 820 was not set, then the request is passed to the BIOS in step 830. When the BIOS returns, step 850 checks the return code to see if the return code was "disk changed". If the return code from the BIOS was "disk changed", then step 870 sets the bit in the disk monitor byte (i.e., the byte designated to hold disk change status for an application program) to inform the application program that a disk change has occurred. Since BIOS is kept informed of the "disk changed" status of a drive, the application program can be made aware of disk changes, including those that occurred during execution of a different application (which might not utilize the disk-watch procedure described above). If the return code from the BIOS is not disk changed, control goes to step 890. The result returned by the BIOS call in step 830 is returned in step 890.

Other methods for dealing with the destruction of BIOS information are possible. For example, according to one method, when insertion of a new diskette is detected, the interrupt vector leading to the BIOS routines which support the particular disk drive are taken control of. The interrupt service routine intercepts all BIOS calls for disk drive service. When a call specifying the drive where the new disk was inserted is issued and the call specifies reading, writing, or disk change information, the interrupt pointer can be reconfigured to the standard handler and the code which indicates "disk change active" is inserted at the storage location used by BIOS for the result of the last operation. A jump is executed to BIOS with a request to return the status of the last call.

Figure 9A:
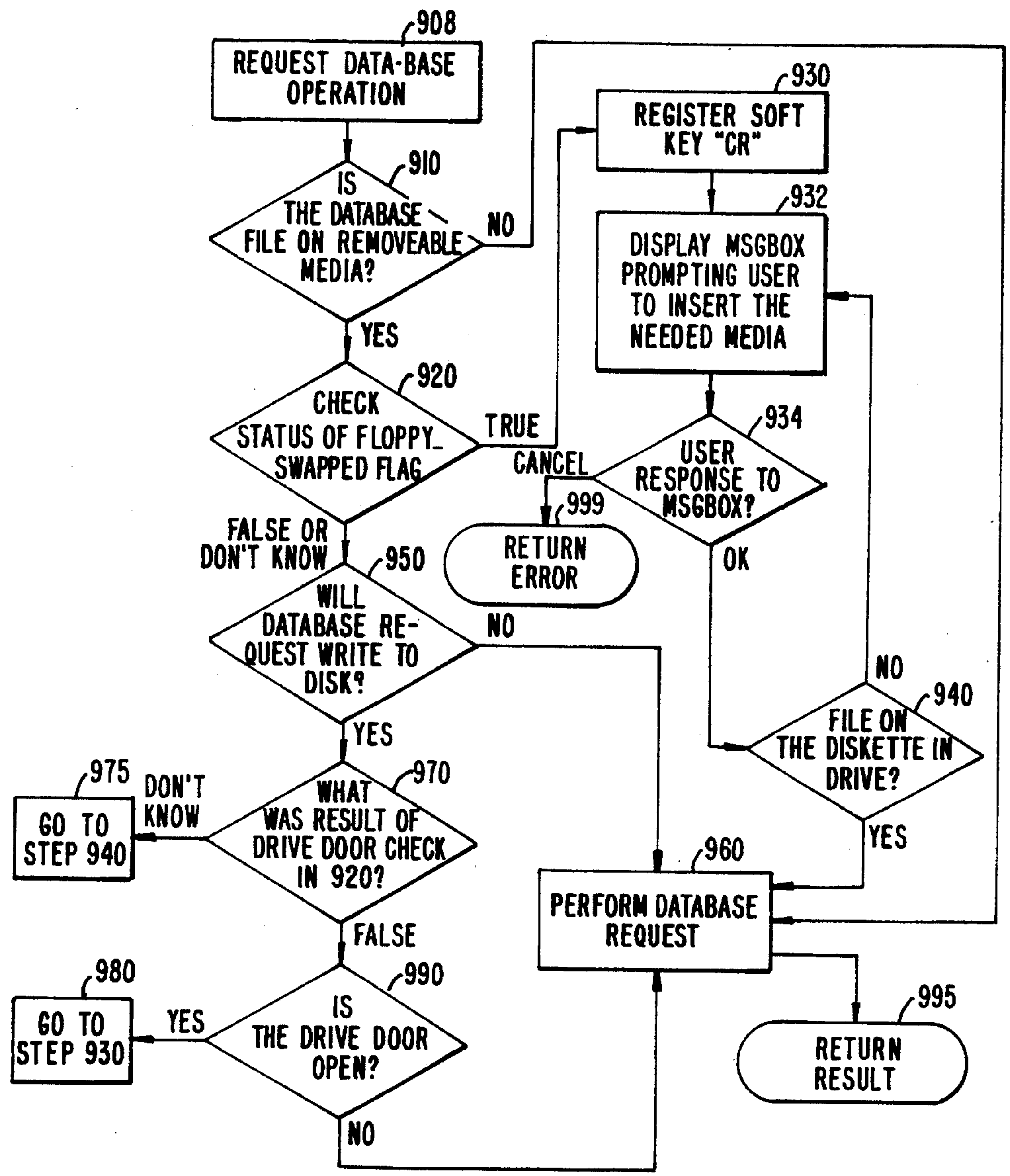
FIG. 9A is a flow diagram of a process to monitor drive door status according to an embodiment of the present invention.
Figure 9B:
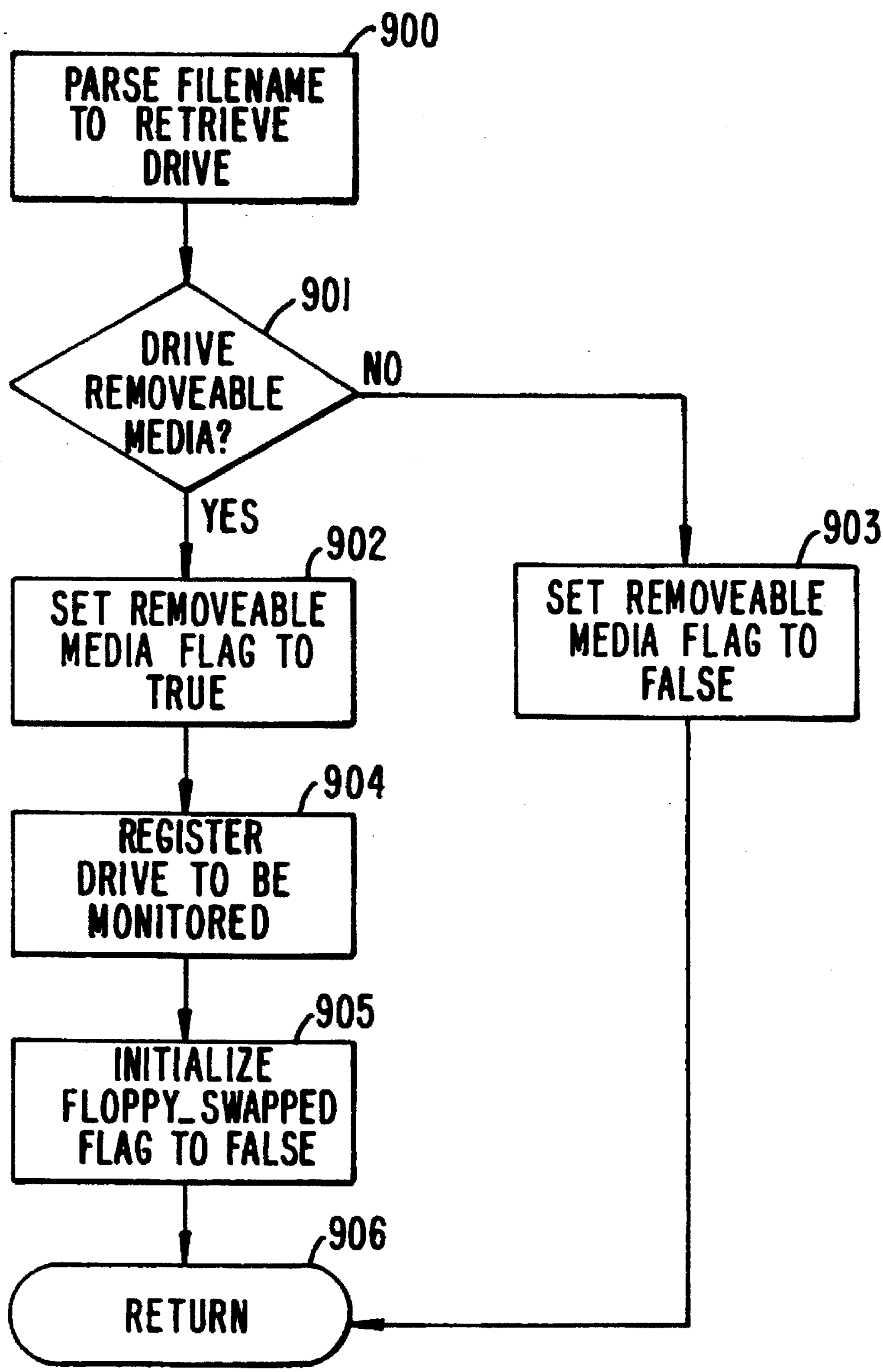
FIG. 9B is a flow diagram of an initialization process according to an embodiment of the present invention.

FIGS. 9A and 9B are flow diagrams of a process for handling database requests to read from a disk and write to a disk, using the present invention. During this process, the invention is used to monitor and record the drive door open status. The invention is utilized to confirm insertion of a disk by generating a "soft key" which will simulate pressing the OK button in response to a message box in a Graphic User Interface when the user is requested to insert a disk.

FIG. 9A utilizes the procedure shown in FIG. 7 to monitor and watch for the insertion of a new disk. The procedure of FIG. 7 can be used to set a floppy swapped flag to one of three states:

- Floppy-swapped=TRUE if the drive door has been opened and subsequently closed since the last inquiry. This is equivalent to a situation in which the "disk changed" flag is set.
- Floppy-swapped=FALSE if the drive door status has not changed since the last inquiry. This is equivalent to a situation in which neither the "disk-changed" nor "disk-out" flags are set.
- Floppy-swapped=DON'T KNOW if the media being checked does not support drive change logic or the process depicted in FIG. 7 is not present.

It is anticipated that the present invention will be found particularly useful in connection with application programs that make intensive use of diskettes, such as database programs. Applications that utilize a database manager for the storage and retrieval of record-oriented data typically have a higher frequency of media access than other applications. Non-database applications characteristically open a file, read its entire contents into memory, manipulate that memory, and at the user's request, write the modified data back to the original media. Media access is user-driven in that the user must typically select a menu option or verify a Save Changes message box to cause data to be written to the storage media. This provides a programmer with predictable circumstances to check for the correct media in a drive. Database applications perform automatic updating of records for the user as data is modified. In the DOS operating system, when a file is opened on removable media, that media is subsequently swapped, and the original file is written to, the swapped media will be corrupted. DOS does not detect an error or warn of swapped media in such a circumstance. Prior to the invention, the only way to know if the correct media was inserted was to ask the operating system to read the directory of the floppy and verify the existence of the desired file before writing to a file. The overhead of seeking and reading a disk directory to determine if the file to be accessed is on that disk, has been prohibitively slow for each operation, especially with the automatic updating of records in a database application. The present invention can be used, in this situation, to avoid corruption of data which results from swapping media without the overhead of reading a directory.

FIG. 9B illustrates preparation work that is done at the time a database file is opened. Step 900 parses the filename to be opened. The drive is checked with the operating system in step 901 to determine if it is removable media. If the media is removable, step 902 sets the removable media flag to TRUE for this file. If the media is not removable, step 903 sets the removable media flag to FALSE for this file. If the file is on removable media, the corresponding drive is registered in step 904 with a process as described in FIG. 7 to monitor the status of that drive. In this context, registering a drive means designating the drive as a drive which will be watched to detect a disk change. Step 904 initializes the floppy-swapped flag to FALSE.

FIG. 9A begins at step 908 when a database operation to read from or write to a disk is requested. In step 910, the removable media flag is checked. If the file is not on removable media, step 960 performs the requested operation and returns the result to the caller in step 995. If the file is on removable media, step 920 checks the status of the floppy-swapped flag. This informs the process whether or not the media has been removed and subsequently replaced. The inquiry also resets the floppy swapped flag to FALSE. If the floppy-swapped flag is TRUE, step 930 will register (i.e., will store) a Carriage Return "soft key" that is to be generated when the drive door is subsequently closed. Step 932 displays a message box to the user requesting that the user insert the disk containing the necessary file. When the user inserts a disk into the drive and closes the door, depression of the OK button on the previously mentioned message box will be automatically simulated for the user by the generation of the requested "soft key". This provides the user with immediate feedback that the disk has been properly inserted, and improves ease of use. Step 934 checks the response to the message box displayed in step 932. If the response is OK, step 940 checks to see if the correct disk has been inserted by reading the directory and file allocation table information from the disk. If the correct disk has been inserted, the requested database operation is carried out in step 960, and the result of that operation is returned to the calling process in step 995. If the correct disk was not inserted, the program loops back to step 932 and redisplays the message box. If the user responded to the message box displayed in step 934 by NOT inserting a disk and by selecting a CANCEL option, step 999 returns an error to the calling process.

In step 920, if the floppy-swapped flag is NOT TRUE the program proceeds to step 950. At step 950, the program has information indicating that the drive door has not been opened and shut; however, it may have been opened. The requested database operation is checked to determine if it will write to the media. If the operation is a read operation (which is not destructive), step 960 will attempt to perform the requested operation and step 995 will return the result of the operation to the caller. If the requested operation will write to the media, step 970 checks the value of the floppy-swapped flag. If the floppy-swapped flag was DON'T KNOW, control is transferred 975 to step 940. If the floppy-swapped flag was set to FALSE, the door-open status is checked in step 990, e.g., by a process similar to that depicted in FIG. 6. If the door is not open, step 960 performs the requested operation and step 995 will return the result to the caller. If the door is open in step 990, control proceeds to step 930.

Although the procedure of FIGS. 9A and 9B have been described with reference to a database application, those skilled in the art will know how to apply the procedure in the context of other applications where it is desired to monitor a change of media.

In light of the above description, a number of advantages of the present invention can be seen. By bypassing the FDC controller, the complexity of procedures necessary to issue a step pulse in order to update door open status information is reduced, in turn reducing the time required and the load on the processor. By preventing unnecessary head movement, wear on the drive mechanism is reduced and the elimination of disconcerting growl or clicking increases user satisfaction and reduces unnecessary service calls. Since door-open status can be monitored, for example on a half-second or shorter cycle, without constant illumination of the drive indicator light, the user is not unnecessarily deterred from inserting a disk. By providing a practical way of determining closure of a drive door following an opening of the door, it is possible for the computer or other apparatus to detect the insertion of a new diskette without requiring the user to separately indicate insertion of a diskette such as by a keyboard or mouse.

A number of variations and modifications of the invention can also be used. The invention can be used in connection with apparatus other than computers, such as word processors, music synthesizers such as MIDI devices, dedicated information storage retrieval and display devices and the like. Although many described processes and steps (other than those indicated as being performed by a specified chip or circuit) are performed at least partly by the CPU, specialized circuits or chips can also be provided for performing such processes and steps. Although in many devices a door is used in conjunction with removing or inserting data recording media, other devices can be used to detect removal or insertion of media or disks such as levers, buttons, electromechanical sensors, optical sensors, magnetic sensors, and the like. Although the preferred embodiment depicts intermediate or interface devices used in providing signals from the processor to the disk drive, such as the SOB interface chip 52 and KMFIT chip 70, it is possible to provide signals directly from the output terminals of the processor to line 88 or to provide additional intermediate devices such as buffers, decoders and the like. Although the present invention includes a number of advantages, it is possible to use certain aspects of the present invention without using other aspects. For example, it is possible to provide for issuing a step pulse in the described simplified manner without eliminating head movement. Setting the head to track 0 in step 754 of FIG. 7B could be eliminated since updated iterations of a step pulse will eventually move the head to the outermost cylinder, after which no further movement of the head will occur. In another alternative, a signal could be conveyed to the disk drive which will result in the disk drive containing information which indicates the head is in the zero cylinder regardless of its actual location, or which will activate the mechanism which prevents movement outward, even when the head is not at the zero cylinder. The method depicted in FIGS. 7A and 7B, however, have at least one advantage. By moving the head to track zero, the head will be positioned near the location it will be required to occupy after a new disk is inserted, in order to read the directory and file allocation table. The procedure of FIG. 7A could be modified to return a soft key when there has been a disk change in a specified drive, rather than in any watched drive. Although it is advantageous to rely on a pull up resistor to set the direction signal (since this reduces the number of bits which must be directly set) the direction signal can also be directly set, if desired.

Although the present invention has been described by way of a preferred embodiment and a number of variations and modifications, other modifications and variations can also be used, the invention being defined by the following claims.

What is claimed is:

1. A method for detecting a disk change in a disk drive coupled to a computer, said computer having a processing unit and a disk controller, said disk drive having input signal lines including a step pulse signal line and a direction signal line, and an output signal line for indicating the opened/closed status of a drive door, said status resettable from an opened status to a closed status only after receipt of a step pulse signal, said disk drive capable of receiving a removable disk and reading from or writing to said disk, said disk drive having at least one head movable among a plurality of cylinder locations and having means for preventing outward head movement from the outermost cylinder location, the method comprising the steps of:

a. moving said at least one head to a clearance position where said disk can be safely removed or inserted without damage to said at least one head when said drive door is open;

b. receiving, in said processing unit, an indication that a signal on said output signal line indicates that said door is opened;

c. preventing subsequent movement of said at least one head, said preventing step including:

i. moving said at least one head to said outmost cylinder location; and ii. maintaining a direction signal on said direction signal line indicating outward direction of said at least one head of said disk drive;

d. sending a step pulse over said step pulse signal line, while said at least one head is positioned at said outmost cylinder location and while maintaining said direction signal on said direction signal line, said sending step producing no movement of said at least one head;

e. receiving, in said processing unit, an indication of the status of said drive door responsive to said step pulse; and f. repeating steps d and e until said status indicates said drive door is closed.

2. A method for detecting a disk change in a disk drive coupled to a computer, said computer having a processing unit and a disk controller, said disk drive having input signal lines including a step pulse signal line and a direction signal line, and said disk drive having an output signal line for indicating the opened/closed status of a drive door, said disk drive having at least one head movable among a plurality of cylinder locations, the method comprising the steps of:

a. moving said at least one head to a clearance position where said disk can be safely removed or inserted without damage to said at least one head when said drive door is open;

b. receiving, in said processing unit, an indication that a signal on said output signal line indicates that said door is open;

c. preventing subsequent movement of said at least one head, said preventing step including:

i. moving said at least one head to said outmost cylinder location; and ii. maintaining a direction signal on said direction signal line indicating outward direction of said at least one head of said disk drive;

d. sending a step pulse from said processing unit over said step pulse signal line without using said disk controller, while said at least one head is positioned at said outmost cylinder location and while maintaining said direction signal on said direction signal line, said sending step producing no movement of said at least one head;

e. receiving, in said processing unit, an indication of the status of said drive door responsive to said step pulse; and f. repeating steps d and e, until said status indicates said drive door is closed.

3. A method, as claimed in claim 2, further comprising the step of discontinuing the sending of said step pulse from said processing unit over said step pulse signal line after said step of receiving an indication of the status of said drive door.

4. A method, as claimed in claim 2, wherein said disk controller includes a status register, said method further comprising the steps of:

storing disk controller availability information in said status register; and sending said step pulse without receiving, in said processing unit, an indication of the contents of said status register.

5. A method, as claimed in claim 2, wherein said method is accomplished by sending no more than three commands from said processing unit.

6. A method, as claimed in claim 2, wherein said step of repeating occurs substantially in the absence of audible noise from head movement within said disk drive.

7. A method, as claimed in claim 2, wherein said drive includes a drive-active indicator light and wherein said step of repeating occurs in the absence of continuous illumination of said indicator light.

8. A method, as claimed in claim 2, further comprising maintaining said at least one head at said outmost cylinder location during at least a portion of said step of repeating.

9. Apparatus for detecting a disk change in a disk drive coupled to a computer, said computer having a processing unit connected to an I/O bus and a disk controller, said disk drive having a first input signal line for a step pulse input signal and a second input signal line for a direction signal and an output signal line for indicating the open/closed status of the drive door, said disk drive having at least one head movable among a plurality of cylinder locations, the apparatus comprising:

means for moving said at least one head to a clearance position where said disk can be safely removed or inserted without damage to said at least one head when said drive door is opened;

means, in said processing unit, for receiving from said I/O bus, an indication that a signal on said output signal line indicates that said door is open;

means, in said disk drive, for preventing outward movement of said at least one head when said at least one head is at a outmost cylinder location and said direction signal indicates outward direction;

means, coupled to said second input signal line, for maintaining a direction signal on said second input signal line indicating outward direction of said at least one head of said disk drive;

means, coupled to said processing unit, for sending a step pulse from said processing unit over said first input signal line without using said disk controller, said step pulse sending means being operable while said at least one head is positioned at said outmost of said plurality of cylinder locations and while maintaining said direction signal on said second input signal line, thereby producing no movement of said at least one head;

means, in said processing unit, for receiving an indication of the status of said drive door over said output signal line, said indication of status being updated in response to said step pulse; and means for repeatedly sending said step pulse and receiving said indication of the status of said drive door, until said status indicates said drive door is closed.

10. The apparatus of claim 9, wherein said clearance position is off the plane of movement of said at least one head during read/write operations.

* * * * *